(12) United States Patent
Xu et al.

(10) Patent No.: US 11,356,939 B2
(45) Date of Patent: Jun. 7, 2022

(54) METHOD AND DEVICE FOR DETERMINING DEPLOYMENT INFORMATION OF NETWORK

(71) Applicant: HUAWEI TECHNOLOGIES CO., LTD., Guangdong (CN)

(72) Inventors: Ruiyue Xu, Shanghai (CN); Kai Zhang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 126 days.

(21) Appl. No.: 16/831,293

(22) Filed: Mar. 26, 2020

(65) Prior Publication Data

US 2020/0229080 A1    Jul. 16, 2020

Related U.S. Application Data

(63) Continuation of application No. PCT/CN2018/103081, filed on Aug. 29, 2018.

(30) Foreign Application Priority Data

Sep. 27, 2017   (CN) .......................... 201710891076.1

(51) Int. Cl.
*H04W 48/18* (2009.01)
*H04L 12/24* (2006.01)
(Continued)

(52) U.S. Cl.
CPC ............ *H04W 48/18* (2013.01); *G06F 9/455* (2013.01); *H04L 41/0806* (2013.01); *H04L 41/0893* (2013.01); *H04L 41/5051* (2013.01)

(58) Field of Classification Search
CPC ..... H04W 48/18; H04W 12/00; H04W 16/04; H04L 41/0806; H04L 41/5048;
(Continued)

(56) References Cited

U.S. PATENT DOCUMENTS

2016/0029047 A1    1/2016 Spidella et al.
2017/0104688 A1    4/2017 Mirahsan et al.
(Continued)

FOREIGN PATENT DOCUMENTS

| CN | 106713406 A | 5/2017 |
|----|-------------|--------|
| CN | 106792739 A | 5/2017 |
| CN | 107155187 A | 9/2017 |

*Primary Examiner* — Abdullahi E Salad
(74) *Attorney, Agent, or Firm* — Womble Bond Dickinson (US) LLP

(57) ABSTRACT

A method and a device for determining deployment information of a network are disclosed. The method for determining deployment information of a network includes: receiving, by a first network entity, a first message sent by a second network entity, where the first message carries first deployment information, and the first deployment information is deployment information of a network component; and determining, by the first network entity, second deployment information based on the first deployment information, where the second deployment information is deployment information of a network, and the network includes at least one network component. The foregoing solution can improve accuracy of determining deployment information of a network.

20 Claims, 11 Drawing Sheets

(51) Int. Cl.
  *G06F 9/455* (2018.01)
  *H04L 41/0806* (2022.01)
  *H04L 41/0893* (2022.01)
  *H04L 41/5051* (2022.01)
(58) Field of Classification Search
  CPC .............. H04L 41/5051; H04L 41/0843; H04L 41/0893; H04L 41/0896; G06F 9/455; G06F 9/45558; G06F 8/60; G06F 2009/45595
  See application file for complete search history.

(56) References Cited

U.S. PATENT DOCUMENTS

| | | | | |
|---|---|---|---|---|
| 2017/0141973 A1* | 5/2017 | Vrzic | ................. | H04L 41/5051 |
| 2017/0164212 A1* | 6/2017 | Opsenica | ............ | H04L 41/0246 |
| 2017/0332421 A1* | 11/2017 | Sternberg | ............ | H04L 12/4641 |
| 2018/0132138 A1* | 5/2018 | Senarath | ............. | H04L 41/5041 |
| 2019/0124508 A1* | 4/2019 | Watfa | ...................... | H04W 4/18 |
| 2020/0382374 A1* | 12/2020 | Yi | ....................... | H04L 41/0893 |

* cited by examiner

METHOD AND DEVICE FOR DETERMINING DEPLOYMENT INFORMATION OF NETWORK

CROSS-REFERENCE TO RELATED APPLICATIONS

This application is a continuation of International Application No. PCT/CN2018/103081, filed on Aug. 29, 2018, which claims priority to Chinese Patent Application No. 201710891076.1, filed on Sep. 27, 2017. The disclosures of the aforementioned applications are hereby incorporated by reference in their entireties.

TECHNICAL FIELD

Embodiments of the present disclosure relate to the field of communications technologies, and in particular, to a method and a device for determining deployment information of a network.

BACKGROUND

A network slice (NS) is a communications resource that ensures that a carried service can reach a service level agreement (SLA) requirement. These resources can be either hard isolated (that is, physically isolated) or logically isolated (that is, soft isolated) as required. It may be considered that a network slice is a combination of a network function and a resource required for completing a particular or some particular services, and is a complete logical network. During automatic deployment, a network slice needs to be designed and planned in advance to generate a network slice template, and then the network slice template is instantiated. Generating a network slice instance is a process of getting online a network slice template designed offline.

At present, in a process of generating a network slice instance, when receiving demand information of a network slice, a network management device may calculate deployment information of the network slice based on the demand information of the network slice. A network service descriptor (NSD) is a template used by a vendor to deploy a network service, and one NSD may include different deployment flavors. Deployment information of a network slice may include information such as an identifier of a network slice template NSD, an identifier of a deployment flavor of the NSD, and an instantiation level. A network management device can send an instantiation request carrying deployment information of a network slice to a management and orchestration device, and the management and orchestration device performs instantiation based on the deployment information of the network slice.

However, a network slice template may include a plurality of network slice subnets. When algorithms for calculating deployment information of a network slice based on demand information of the network slice in different network slice subnets are different, a network management device cannot accurately calculate the deployment information of the network slice based on received demand information of the network slice, and consequently, accuracy of determining deployment information of a network is reduced.

SUMMARY

Embodiments of the present disclosure provide a method and a device for determining deployment information of a network. When a network component template is nested in a network template, more comprehensive deployment information is included in deployment information sent to a management and orchestration device, so that accuracy of determining the deployment information of the network can be improved.

According to a first aspect, an embodiment of the present disclosure provides a method for determining deployment information of a network, including: receiving, by a first network entity, a first message sent by a second network entity, where the first message carries first deployment information, and the first deployment information is deployment information of a network component; and determining, by the first network entity, second deployment information based on the first deployment information, where the second deployment information is deployment information of a network, and the network includes at least one network component. When a plurality of network component templates are nested in a network template, the first network entity may receive deployment information of a plurality of network components, and obtain deployment information of a complete network based on the deployment information of the plurality of network components, where the deployment information of the network includes association relationships among various network components, and more comprehensive deployment information is included in deployment information sent to a management and orchestration device, so that accuracy of determining deployment information of a network can be improved.

In an embodiment, the determining, by the first network entity, second deployment information based on the first deployment information includes: determining, by the first network entity, the second deployment information in a network template based on the first deployment information, where the network template includes deployment information of at least one network. The network template including the deployment information of the network may be prestored in a database to be invoked by the first network entity. The deployment information of the network obtained by the first network entity includes more comprehensive deployment information, so that the accuracy of determining deployment information of a network can be improved.

In an embodiment, before the receiving, by the first network entity, a first message sent by a second network entity, the method further includes: sending, by the first network entity, a second message to the second network entity, where the second message carries demand information of the network component and an identifier of a network component template, and the demand information of the network component and the identifier of the network component template are used to determine the first deployment information.

In an embodiment, before the sending, by the first network entity, a second message to the second network entity, the method further includes: obtaining, by the first network entity, an identifier of a network component template based on the network template; and obtaining, by the first network entity, demand information of the network component based on the demand information of the network.

In an embodiment, the first deployment information includes at least one of the following: a virtual resource descriptor identifier corresponding to the network component, a virtual resource deployment flavor corresponding to the network component, a virtual resource instantiation level corresponding to the network component, affinity and anti-affinity of virtual resource deployment corresponding to the network component, and virtual resource deployment location constraint information corresponding to the network component; and the second deployment information includes at least one of the following: a virtual resource descriptor identifier corresponding to the network, a virtual resource deployment flavor corresponding to the network, a virtual resource instantiation level corresponding to the network, affinity and anti-affinity of virtual resource deployment corresponding to the network, and virtual resource deployment location constraint information corresponding to the network.

In an embodiment, the network component is a network slice subnet, the network component template is a network slice subnet template, and the network is a network slice. The network management device can receive deployment information of a plurality of network slice subnets or deployment information of a plurality of network functions, and obtain deployment information of a complete network slice based on the deployment information of the plurality of network slice subnets or deployment information of the plurality of network functions, where deployment information of a network slice includes deployment information of various network slice subnets or association relationships among various network functions, and more comprehensive deployment information is included in deployment information sent to the management and orchestration device, so that accuracy of determining deployment information of a network slice can be improved.

In an embodiment, the network component is a network function, the network component template is a network function template, and the network is a network slice or a network slice subnet. The network management device or a domain management device may receive deployment information of a plurality of network functions, and obtain deployment information of a complete network slice or deployment information of a network slice subnet based on the deployment information of the plurality of network functions, where the deployment information of the network slice or the deployment information of the network slice subnet includes association relationships among various network functions, and more comprehensive deployment information is included in deployment information sent to the management and orchestration device, so that the accuracy of determining deployment information of a network can be improved.

In an embodiment, after the determining, by the first network entity, second deployment information based on the first deployment information, the method further includes: sending, by the first network entity, a third message carrying the second deployment information to a third network entity.

According to a second aspect, an embodiment of the present disclosure provides another method for determining deployment information of a network, including: receiving, by a second network entity, a second message sent by a first network entity, where the second message carries demand information of a network component and an identifier of a network component template; determining, by the second network entity, first deployment information based on the demand information of the network component and a network component template corresponding to the identifier of the network component template, where the first deployment information is deployment information of the network component; and sending, by the second network entity, a first message to the first network entity, where the first message carries the first deployment information. When a plurality of network component templates are nested in a network template, the first network entity may receive deployment information of a plurality of network components, and obtain deployment information of a complete network based on the deployment information of the plurality of network components, where the deployment information of the network includes association relationships among various network components, and more comprehensive deployment information is included in deployment information sent to a management and orchestration device, so that accuracy of determining deployment information of a network can be improved.

In an embodiment, the network component template includes deployment information of at least one network component; and the determining, by the second network entity, first deployment information based on the demand information of the network component and a network component template corresponding to the identifier of the network component template includes: determining, by the second network entity, the first deployment information in the deployment information of the at least one network component based on the demand information of the network component.

In an embodiment, the first deployment information includes at least one of the following: a virtual resource descriptor identifier corresponding to the network component, a virtual resource deployment flavor corresponding to the network component, a virtual resource instantiation level corresponding to the network component, affinity and anti-affinity of virtual resource deployment corresponding to the network component, and virtual resource deployment location constraint information corresponding to the network component.

In an embodiment, the network component is a network slice subnet, the network component template is a network slice subnet template, and the network is a network slice.

In an embodiment, the network component is a network function, the network component template is a network function template, and the network is a network slice or a network slice subnet.

In an embodiment, the method further includes: when the second network entity detects that the network component meets a preset condition, determining, by the second network entity, third deployment information based on the preset condition, where the third deployment information is deployment information of the network component; including, by the preset condition, at least one of the following: a quantity of users carried on the network component is greater than a preset threshold, or the second network entity is detected to be faulty; and sending, by the second network entity, a fourth message carrying the third deployment information to the first network entity. For example, when the second network entity is faulty, the second network entity may generate the third deployment information based on related fault information, and then send the third deployment information to the first network entity. In this case, the first network entity deploys a network based on the third deployment information.

According to a third aspect, an embodiment of the present disclosure provides a network entity, where the network entity includes a module or a unit configured to perform the method for determining deployment information of a network provided in any one of the first aspect or the possible implementations of the first aspect.

According to a fourth aspect, an embodiment of the present disclosure provides another network entity, where the network entity includes a module or a unit configured to perform the method for determining deployment information of a network provided in any one of the second aspect or the possible implementations of the second aspect.

According to a fifth aspect, an embodiment of the present disclosure provides yet another network entity, including: a processor, a memory, a transceiver, and a bus, where the processor, the transceiver, and the memory communicate with each other through the bus; the transceiver is configured to receive and send data; the memory is configured to store an instruction; and the processor is configured to invoke the instruction in the memory, and perform the method for determining deployment information of a network provided in any one of the first aspect or the possible implementations of the first aspect.

According to a sixth aspect, an embodiment of the present disclosure provides yet another network entity, including: a processor, a memory, a transceiver, and a bus, where the processor, the transceiver, and the memory communicate with each other through the bus; the transceiver is configured to receive and send data; the memory is configured to store an instruction; and the processor is configured to invoke the instruction in the memory, and perform the method for determining deployment information of a network provided in any one of the second aspect or the possible implementations of the second aspect.

According to a seventh aspect, an embodiment of the present disclosure provides a computer-readable storage medium, where the storage medium includes an instruction, and when the instruction is run on a network entity, the network entity is enabled to perform the method for determining deployment information of a network provided in any one of the first aspect or the possible implementations of the first aspect.

According to an eighth aspect, an embodiment of the present disclosure provides another computer-readable storage medium, where the storage medium includes an instruction, and when the instruction is run on a network entity, the network entity is enabled to perform the method for determining deployment information of a network provided in any one of the second aspect or the possible implementation of the second aspect.

According to a ninth aspect, an embodiment of the present disclosure provides a computer program, where the computer program includes an instruction, and when the instruction is run on a network entity, the network entity is enabled to perform the method for determining deployment information of a network provided in any one of the first aspect or the possible implementations of the first aspect.

According to a tenth aspect, an embodiment of the present disclosure provides another computer program, where the computer program includes an instruction, and when the instruction is run on a network entity, the network entity is enabled to perform the method for determining deployment information of a network provided in any one of the second aspect or the possible implementations of the second aspect.

According to an eleventh aspect, an embodiment of the present disclosure provides a chip product of a network entity, to perform the method in any one of the first aspect or the possible implementations of the first aspect.

According to a twelfth aspect, an embodiment of the present disclosure provides a chip product of another network entity, to perform the method in any one of the second aspect or the possible implementations of the second aspect.

In the embodiments of the present disclosure, when a network component template is nested in a network template, the first network entity associated with the network template decomposes demand information of a network into demand information of a network component, and sends an identifier of the network component template and the demand information of the network component to a second network entity associated with the network component. The second network entity obtains deployment information of the network component based on the received identifier of the network component template and the demand information of the network component, and sends the deployment information of the network component to the first network entity. When a plurality of network component templates are nested in a network template, the first network entity may receive deployment information of a plurality of network components, and obtain deployment information of a complete network based on the deployment information of the plurality of network components, where the deployment information of the network includes association relationships among various network components, and more comprehensive deployment information is included in deployment information sent to the management and orchestration device, so that accuracy of determining deployment information of a network can be improved.

DESCRIPTION OF EMBODIMENTS

Figure 1:
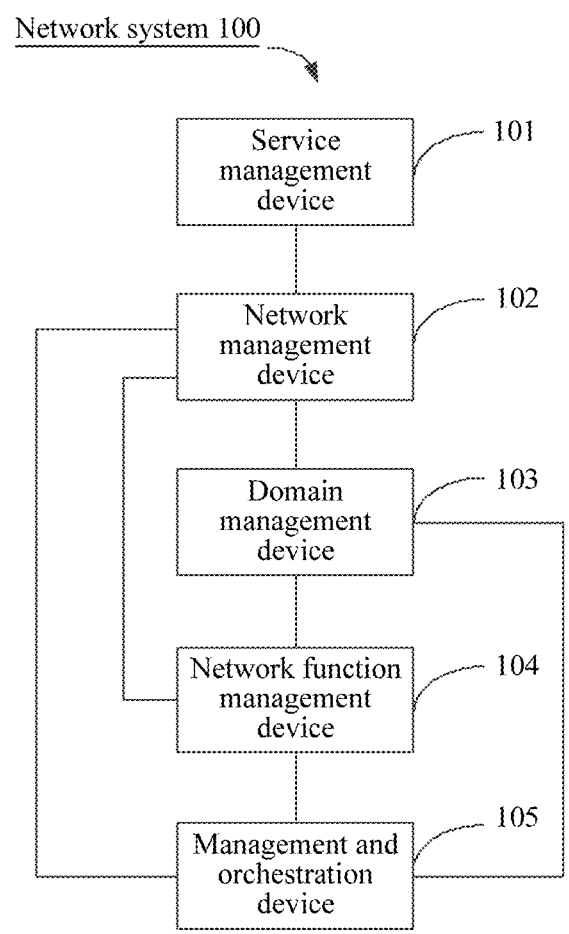
FIG. 1 is a schematic architectural diagram of a network system according to an embodiment of the present disclosure.

First, for ease of understanding embodiments of the present disclosure, some concepts or terms in the embodiments of the present disclosure are explained.

(1) Network Slice

Network slices (NS) are different logical networks customized based on different service requirements. It may be considered that a network slice is a combination of a network function and a resource required for completing one or some services, and is a complete logical network. A network slice may be an end-to-end network including a terminal, an access network (AN), a transport network (TN), a core network (CN), and an application server, can provide a complete telecommunication service, and has a certain network capability. A network slice may alternatively be any combination of the foregoing terminal, access network, transport network, core network, and application server. Based on different requirements, different network slices may be hard isolated, namely physically isolated, or soft isolated, namely logically isolated. The network slice herein may be a generalized concept. Both a conventional network and a dedicated network may be considered as a network slice, and it may also be considered that a network slice subnet is also a network slice.

(2) Network Service

A network service (NS) may be implemented by a plurality of virtualized network functions (VNF). It may be considered that a network service is an underlying virtual resource corresponding to a network slice, so that a corresponding network service needs to be instantiated when a network slice is deployed. A network service descriptor (NSD) is a template used by a vendor to deploy a network service, and one NSD may include different deployment flavors. Different network service descriptors may be distinguished by using an identifier of an NSD (for example, an NSD ID), network services of different flavors in a same network service descriptor are distinguished by using an NSD deployment flavor identifier (for example, a deployment flavor ID), and the network service uniquely determined by the identifier of the NSD and the identifier of the deployment flavor of the NSD can be referred to as a virtual resource of a network slice template or a virtual resource of a network slice subnet template.

(3) Network Slice Template

A network slice template (NST) is generated when a network is designed and planned offline. A corresponding property may be selected based on a feature of a particular service that is expected to be run on a network slice, including a required function, performance, security, reliability, service experience, and operation and maintenance feature. A slice template is generated after a design is completed. After an offline design is completed, a network slice template may be instantiated into a network slice instance online. One design and multiple deployments is a principle of a network slice template. A network slice subnet template (NSST) and/or a network function template (NFT) may be nested in a network slice template. Nest means that a network slice template may include one or more network slice subnet templates or network function templates. It may also mean that a network slice template includes identifiers of one or more network slice subnet templates or network function templates, where the identifier indicates one network slice subnet template or network function template. In addition, a network function template may be nested in a network slice subnet template. In this specification, a network slice subnet template or a network function template nested in a network slice template may be collectively referred to as a network component template, and correspondingly, a network slice template including a network slice subnet template and/or a network function template may be referred to as a network template. A network function template nested in a network slice subnet template or a network slice template may be referred to as a network component template, and correspondingly, a network slice subnet template or a network slice template including a network function template is referred to as a network template.

In the present disclosure, a network slice template may include two or more layers of nested relationships. For example, a network slice subnet template and/or a network function template are nested in a network slice template, in which the network function template is nested in the network slice subnet template. It may be understood that, a relationship between the foregoing network and network component is for any two-level nested relationship. The application is described by taking two-layer nesting as an example. More layers of nested relationships may also be deduced by analogy, and details are not described herein again. In the present disclosure, a network slice template, a network slice subnet template and a network function template are named based on a function, and a name is not limited in any way. Each of the foregoing templates may also have another name, such as a network slice descriptor, a network slice subnet descriptor and a network function descriptor.

(4) Network Slice Instance

A network slice instance (NSI) is obtained by instantiating a network slice template, and is a real running logical network, which can meet a certain network feature or service requirement. A network slice instance can provide one or more services. A network slice instance may be created by a management and orchestration device, and a management and orchestration device may create multiple network slice instances and manage them simultaneously, including performance monitoring and fault management during operation of a network slice instance. When multiple network slice instances coexist, some network resources and network functions may be shared between network slice instances. A complete network slice instance is capable of providing a complete end-to-end network service, and a constituent part of a network slice instance may be a network slice subnet instance (NSSI) and/or a network function instance.

A network slice instance may be divided into a plurality of network slice subnet instances, to facilitate a management and orchestration device for management. A network slice subnet instance may not need to provide an end-to-end complete network service, and a network slice subnet instance may be a set of network function instances of a same equipment provider in a network slice instance, or a set of network function instances divided by domains, such as a core network slice subnet instance, an access network slice subnet instance, or a collection of other ways, such as a deployment location. A network slice subnet instance may be shared by multiple network slices. A network slice subnet instance may include several network slice subnet instances and network function instances that are not divided into network slice subnet instances. A network slice instance may also include only a plurality of network function instances. A network slice subnet instance may also include a plurality of network function instances.

(5) Network Function

A network function (NF) is a processing function in a network, and defines a functional behavior and interface. A network function may be implemented through dedicated hardware, or implemented by running software on dedicated hardware, or implemented in a form of a virtual function on a general hardware platform. A physical network function and/or a virtualized network function are collectively referred to as a network function below.

(6) Virtual Resource

A virtual resource is a logical resource constructed on a physical resource by using a virtualization platform, and is used for supporting a network. For example, a virtual CPU (vCPU) is used to implement a computing and processing function in a network. A virtual resource required for implementing a network slice or a network slice subnet in this specification may be referred to as a network service NS, and a virtual resource required for implementing a network function may be referred to as a VNF.

(7) Demand Information of a Network or a Network Component

Demand information of a network or a network component may include one or more of a latency requirement, a bandwidth requirement, a coverage area requirement, a user quantity requirement (a capacity requirement), a mobility requirement, a throughput requirement, a reliability requirement, a deployment location requirement, an affinity and anti-affinity requirement, a success rate requirement, a network slice type requirement, and the like.

Specifically, a latency requirement is a requirement on response time of a network or a network component. A latency requirement may be a maximum latency that does not exceed a preset threshold, where the maximum latency is maximum response time of a network or a network component. For example, a maximum latency of a network or a network component is required to be 10 ms, that is, it is expected that a maximum response time of the network or the network component is 10 ms. A bandwidth requirement may be used to describe a bandwidth that is required to be provided by a network or a network component, for example, a minimum bandwidth of a network or a network component is required to be 10 M. A coverage area requirement is used to describe a network coverage area used by a network or a network component, for example, the Shanghai area. A user quantity requirement is used to describe a maximum quantity of users that the network or the network component is required to carry. For example, before deployment of a network or a network component, it is expected one million users may access, a user quantity requirement is greater than or equal to one million. A mobility requirement is used to describe movement of a terminal device accessing the network or the network component, for example, moving or fixed. A mobility requirement may further describe a movement speed of a terminal device accessing the network or the network component. An affinity and anti-affinity requirement is a deployment location requirement between a network or a network component and another network or network component. A success rate is used to describe a success rate of using the network or the network component by a terminal device, and may include a reporting success rate and a delivery success rate. A throughput rate describes a data forwarding capability of a network or a network component, for example, 100 Mbit/s indicates that the network or the network component supports transmission of 100 Mbit data within one second. A reliability requirement is used to indicate a capability of a network or a network component to complete its function or a degree of continuous work. A network slice type requirement may be divided based on a function. For example, a network slice type may be one of the following: enhanced mobile broadband (eMBB), ultra reliable and low latency communications (URLLC), and massive machine type communications (mMTC).

In one embodiment, a network slice subnet or a network function may be nested in a network slice, a network slice may be a network, and a network slice subnet or a network function may be a network component. In another embodiment, a network function may be nested in a network slice subnet, a network slice subnet may be a network, and a network function may be a network component.

In the foregoing two scenarios, demand information of a network slice may be obtained by a service management device based on a received service requirement of an operator and/or a third-party client, and is sent to a network management device. In one embodiment, an algorithm or a policy from a service requirement to a network requirement may be locally stored in a network slice template, which is used to convert the service requirement to demand information of a network slice. Taking that a service whose service requirement is that a service type is Internet of Vehicles (vehicle to vehicle, V2X) as an example, due to high reliability and low latency required by a V2X service, a mapping policy may be pre-established to map a service of V2X to demand information: a network slice type requirement is URLLC.

Demand information of a network slice subnet may be that a network management device decomposes, based on a prestored policy or algorithm, demand information of a network slice into demand information of each network component, and is delivered to a domain management device. The prestored policy or algorithm may indicate allocation of demand information by a policy identifier or algorithm identifier. For example, the policy identifier or the algorithm identifier may indicate that demand information of a network slice is allocated by different network domains in a preset proportion. For another example, the policy identifier or algorithm identifier may also indicate, based on different network slice subnet templates, that decomposition of demand information is performed by different network slice subnet at a geographic location in a preset proportion.

Demand information of a network function may be that a network management device and/or a domain management device decompose, based on a prestored policy or algorithm, demand information of a network slice and/or a network slice subnet into demand information of each network function, and is delivered to a network function management device.

(8) Deployment Information of a Network or a Network Component

Deployment information of a network or a network component may include a virtual resource descriptor identifier corresponding to the network or the network component and/or an identifier of a virtual resource deployment flavor corresponding to the network or the network component. Deployment information of a network or a network component may further include one or more of the following: a virtual resource instantiation level corresponding to the network or the network component, constraint information of a location of a virtual resource corresponding to the network or the network component, and affinity or anti-affinity information of deployment of a virtual resource corresponding to the network or the network component. Some information in the deployment information may also be calculated based on a locally prestored algorithm. For example, the affinity and anti-affinity information may be calculated based on the locally prestored algorithm. If a latency requirement is high, that is, a latency requirement of demand information of a network or a network component is high, a parameter corresponding to affinity and anti-affinity information may be set to determine that the network or network component is deployed near a base station, to reduce communication latency with the base station.

Deployment information of a network or a network component may be an NSD profile calculated based on demand information of the network or the network component. A virtual resource descriptor identifier corresponding to a network or a network component may be a network service descriptor identifier (NSD ID) or a virtual network function descriptor (VNFD) identifier (ID). An identifier of a virtual resource deployment flavor corresponding to a network or a network component may be an identifier of a deployment flavor of a network service (that is, an NS Flavor ID) or an identifier of a deployment flavor identifier (that is, a VNF Flavor ID). A virtual resource instantiation level corresponding to a network or a network component may be a network service instantiation level (NSInstantiationlevel) or a virtual network function instantiation level (NSInstantiationlevel). Affinity or anti-affinity of deployment of a virtual resource corresponding to a network or a network component may also include affinity and anti-affinity of a network service or affinity and anti-affinity of a VNF. Virtual resource deployment location constraint information corresponding to a network or a network component may also include deployment location constraint information of a network service or deployment location constraint information of a VNF.

A virtual resource instantiation level corresponding to a network or a network component is used to indicate a capacity of a virtual resource instance, and different instantiation levels of virtual resources indicate different capacities. The capacity herein may represent a carrying capability of a network or a network component, for example, may be a quantity of users carried. Affinity and anti-affinity information of deployment of a virtual resource corresponding to a network or a network component indicates whether the virtual resource corresponding to the network or the network component can be deployed in a same region with a network or a network component with another function. For example, a network or a network component may be deployed together with a data center, a server, or the like. Constraint information of a location of a virtual resource corresponding to a network or a network component indicates limitation on a geographic location of the virtual resource deployment corresponding to the network or the network component based on a functional requirement of the network or the network component. For example, a virtual resource corresponding to a network or a network component needs to interact information with a data center. For convenience of interacting with the data center, the virtual resource corresponding to the network or the network component may be deployed in the data center. For another example, the network or the network component has a relatively high communication latency requirement, and a corresponding virtual resource may be deployed at a position near a base station to reduce communication latency, or the like.

In one embodiment, deployment information of a network or a network component may also include at least one piece of the following information: description information of a deployed physical network function, and existing VNF instance information. Description information of a deployed physical network function is used to inform a management and orchestration device of how to connect a virtual resource to the physical network function, for example, connection information of the physical network function, to be specific, an IP address. Existing VNF instance information is used to indicate that there is a VNF instance to be reused, and information of the reused VNF instance, for example, an identifier of an existing VNF instance, a flavor of an existing VNF instance, or the like.

FIG. 1 is a schematic architectural diagram of a network system according to an embodiment of the present disclosure. As shown in FIG. 1, the network system 100 includes: a service management function (SMF) device 101, a network management (NM) device 102, a domain management (DM) device 103, a virtualized network function management (VNFM) device, and a management and orchestration (MANO) device 105.

The service management device 101 is mainly configured to: implement service management, for example, lifecycle management of a service, monitoring of a service, and charging of a service, convert a service requirement of an operator and/or a third-party client into demand information of a network, and send the demand information of the network to the network management device 102 through an interface between the service management device 101 and the network management device 102.

The network management device 102 is configured to receive a network management request sent by the service management device 101, where the request may carry demand information of a network. The network management device 102 may also have one or more of the following functions: managing a network, including managing a lifecycle, performance, a fault, and configuration of a network and/or a network subnet; and further managing a network template and/or a network subnet template. The network management device 102 is further configured to: when receiving a network request, obtain a network template based on the network request, where the network template may be obtained based on network template indication information (for example, an identifier of a network template) included in the network request, or the network template may be calculated and matched based on demand information of the network carried in the network request and a decomposition algorithm locally prestored in the network management device 102. The network management device 102 matches, based on the demand information of the network, deployment information of the network from the network template. The network management device 102 may send the obtained deployment information of the network to the management and orchestration device 105 through an interface between the network management device 102 and the management and orchestration device 105.

When no network subnet template and network function template are nested in a network template, the network management device 102 may perform the foregoing method for obtaining deployment information of a network; when a network slice subnet template or a network function template is nested in a network slice template, the network management device 102 performs the following operations: The network management device 102 is further configured to: parse a network template to obtain identifiers of one or more network subnet templates and/or identifiers of one or more network function templates, and decompose demand information of a network into demand information of a network subnet and/or demand information of a network function. An identifier of each network subnet template corresponds to demand information of one network subnet; and an identifier of each network function template corresponds to demand information of one network function. An identifier of each network subnet template and corresponding demand information of a network subnet are sent to the domain management device 103 through an interface between the network management device 102 and the domain management device 103. The network management device 102 further sends an identifier of a network function template and demand information of a network function to each network function management device 104 through an interface between the network management device 102 and each network function management device 104.

The network management device 102 also centrally orchestrates each network subnet and/or network function, so that different network subnets and/or network functions can satisfy demand information of a target service or network. Specifically, the demand information may be at least one of the following demand information of a service or a network: a requirement of a service-level agreement (SLA), a requirement of a key performance indicator (KPI), and a requirement of quality of service (QoS).

The domain management device 103 may have one or all of network subnet management functions or network subnet orchestration functions, and may have some or all of the following functions: lifecycle management of a network subnet, such as creation, update, deletion, fault management, performance management, and configuration management of a network subnet; and management of a network service, including lifecycle management of a network service, fault management of a network service, performance management of a network service, configuration management of a network service; coordination of network functions, and the like. The domain management device 103 is further configured to receive, through the interface between the domain management device 103 and the network management device 102, an identifier of a network subnet template and corresponding demand information of a network subnet that are sent by the network management device 102. The domain management device 103 may be associated with one or more network subnet templates. The association herein may be understood as management. The domain management device 103 may be divided into a CN management device, an AN management device, and a TN management device based on a network type of a managed network slice subnet. Based on a received identifier of a network subnet template, the domain management device 103 searches for a network subnet template corresponding to the identifier, and calculates and matches, target deployment information in the network subnet template corresponding to the identifier, based on received demand information of a network slice and a decomposition algorithm locally stored in the domain management device 103. Each network subnet template may include at least a piece of deployment information of a network subnet. The domain management device 103 may further send the target deployment information to the management and orchestration device 105 through an interface between the domain management device 103 and the management and orchestration device 105.

When no network function template is not nested in a network subnet template, the network management device 102 may perform the foregoing method for obtaining deployment information of a network subnet; when a network function template is nested in a network subnet template, the domain management device 103 performs the following operations: the domain management device 103 is further configured to parse the network subnet template to obtain identifiers of one or more network function templates, and decompose demand information of a network subnet into demand information of a network function. An identifier of each network function template corresponds to demand information of one network function. An identifier of each network function template and corresponding demand information of a network function are sent to the network function management device 104 through the interface between the domain management device 103 and the network function management device 104.

The network function management device 104 may have a part of or all of the following functions: lifecycle management of a network function, such as creation, update, deletion, fault management, performance management, and configuration management of a network function; and management of a network service, including lifecycle management of a network service, fault management of a network service, performance management of a network service, configuration management of a network service; coordination of network functions, and the like. The network function management device 104 is further configured to receive, through an interface between the network function management device 104 and the network management device 102, an identifier of a network function template and corresponding demand information of a network function that are sent by the network management device 102. The network function management device 104 may be associated with one or more network function templates. By using a received identifier of a network function template, the network function management device 104 searches for a network function template corresponding to the identifier, and calculates and matches, based on received demand information of a network function and a decomposition algorithm locally stored in the network function management device 104, target deployment information of the network function template corresponding to the identifier. Each network function template may include a piece of deployment information of a network function. Similarly, the network function management device 104 is further configured to receive, through an interface between the network function management device 104 and the domain management device 103, an identifier of a network function template and corresponding demand information of a network function that are sent by the domain management device 103. By using a received identifier of a network function template, the network function management device 104 searches for a network function template corresponding to the identifier, and calculates and matches, based on received demand information of a network function and a decomposition algorithm locally stored in the network function management device 104, target deployment information of the network function template corresponding to the identifier. The network function management device 104 may further send the target deployment information to the management and orchestration device 105 through an interface between the network function management device 104 and the management and orchestration device 105.

The management and orchestration device 105 may receive an instantiation request that is sent by the network management device 102 and carries deployment information of a network, and deploy a virtual resource of the network based on the instantiation request carrying the deployment information of the network. The management and orchestration device 105 may further directly receive an instantiation request that is sent by the domain management device 103 and carries deployment information of a network subnet, and perform instantiation based on the instantiation request carrying the deployment information of the network subnet. The management and orchestration device 105 may further directly receive an instantiation request that is sent by the network function management device 104 and carries deployment information of a network function, and perform instantiation based on the instantiation request carrying the deployment information of the network function. In addition, the management and orchestration device 105 may further have a part of or all of the following functions: lifecycle management of a network function and/or a network service, fault management of a network function and/or a network service, performance management of a network function and/or a network service, configuration management of a network function and/or a network service, allocation of a virtual resource, reservation of a virtual resource, and the like.

The foregoing network may be a network slice, or may be referred to as an end-to-end (E2E) network slice. The foregoing network may include at least one of a core network part, an access network part, and a transport network part. The foregoing network subnet may be a network slice subnet, or may include at least one of a core network part, an access network part, and a transport network part. From a perspective of logic, a network and a network subnet are a collection of a set of network functions.

It should be noted that, the service management device 101, the network management device 102, the domain management device 103, and the management and orchestration device 104 are all named based on a function. For each of the foregoing devices, a name of a device is not limited, and each of the foregoing devices may have another name. Each of the foregoing devices may be an independent device. Specifically, the service management device 101 may be one or more of the following: a communication service management function (CSMF), a service orchestration device, and a service management and orchestration device. The network management device 102 may be one or more of the following: a network slice management function (NSMF) device, an inter-domain management device, an inter-domain network slice management device, or another device executing the foregoing functions. The domain management device 103 may be one or more of the following: a domain slice management device, a network slice subnet management function (NSSMF) device, or another device executing the foregoing functions. The management and orchestration device 104 may be one or more of the following: a network functions virtualization orchestrator (NFVO), a virtualized network function manager (VNFM), a virtualized infrastructure manager (VIM), or another device executing the foregoing functions. Each of the foregoing devices may also be a function in a management device. Specifically, each device may be one or more functions of the following devices: a network orchestration device, a network management and orchestration device, a network element management device, a service orchestration device, a service management and orchestration device, or an NFVO. Each network device may be included in an office of strategic services (the office of strategic services, OSS), or may not be included in the OSS, and this is not limited herein.

The network system shown in FIG. 1 is merely used to more clearly describe the technical solutions of the present disclosure, and does not constitute a limitation on the present disclosure. A person of ordinary skill in the art may know that as a network system evolves and a new business scenario emerges, for a similar technical problem, the technical solutions provided in the present disclosure are also applicable.

Figure 2:
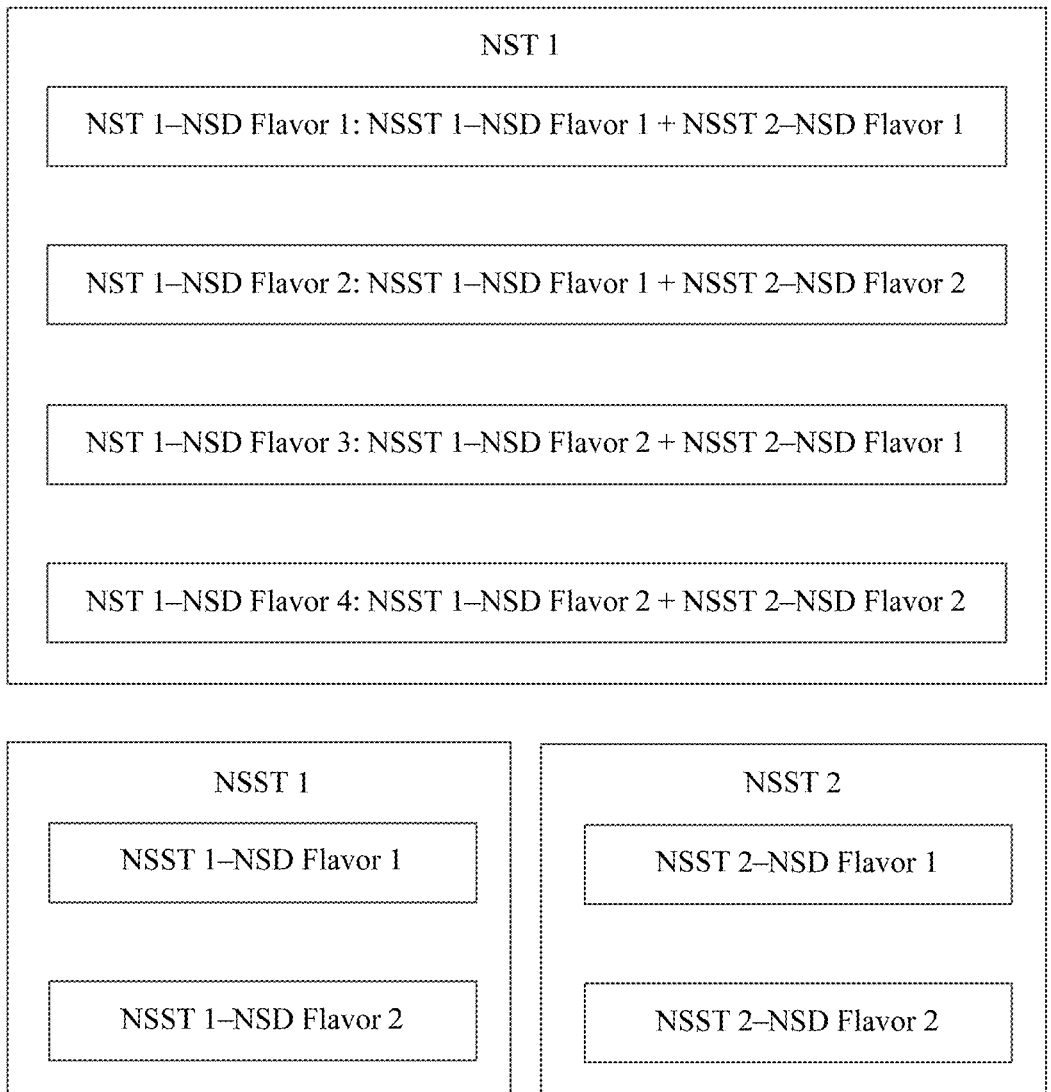
FIG. 2 is a schematic structural diagram of an NST and an NSST according to an embodiment of the present disclosure.

FIG. 2 is a schematic structural diagram of an NST and an NSST. As shown in FIG. 2, a network slice subnet template is nested in the network slice template, and a network function template may be nested in the network slice template. For example, a network slice subnet template is nested in the network slice template. A case in which a network function template is nested in the network slice template is similar to a case in which a network function template is nested in the network slice subnet template, and the rest may be deduced by analogy. Specifically, as shown in FIG. 2, the NST may include deployment information of different network slices. Deployment information of each network slice may include an identifier of deployment information of a network slice subnet, that is, an identifier of a deployment flavor of an NSD of an NSST. As shown in FIG. 2, based on different NST-NSD identifiers, an NST 1 may include four pieces of deployment information of network slices, which are respectively: (1) NST 1-NSD Flavor 1: NSST 1-NSD Flavor 1+NSST 2-NSD Flavor 1, (2) NST 1-NSD Flavor 2: NSST 1-NSD Flavor 1+NSST 2-NSD Flavor 2, (3) NST 1-NSD Flavor 3: NSST 1-NSD Flavor 2+NSST 2-NSD Flavor 1, and (4) NST 1-NSD Flavor 4: NSST 1-NSD Flavor 2+NSST 2-NSD Flavor 2. Each piece of deployment information of a network slice includes an identifier of deployment information of a network slice subnet 1 and an identifier of deployment information of a network slice subnet 2. The NSST 1 is a template of the network slice subnet 1, and the NSST 2 is a template of the network slice subnet 2. The identifier of the deployment information of the network slice subnet 1 and the identifier of the deployment information of the network slice subnet 2 may be used for determining the deployment information of the network slice subnet 1 and the deployment information of the network slice subnet 2 that are corresponding to the identifier of the deployment information of the network slice subnet 1 and the identifier of the deployment information of the network slice subnet 2.

Figure 3:
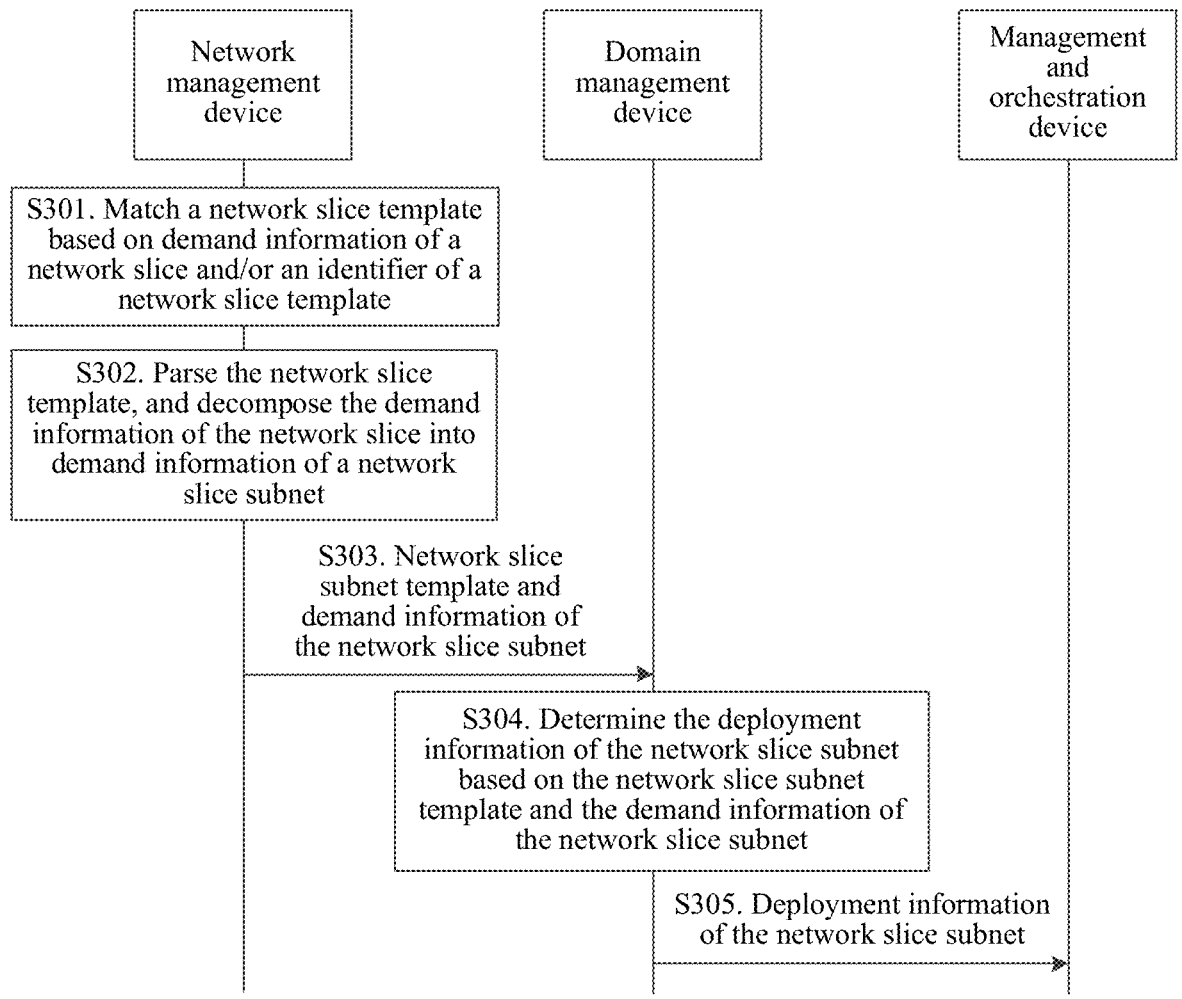
FIG. 3 is a schematic flowchart of a method for determining deployment information of a network according to the prior art.

Refer to FIG. 3. In the prior art, a schematic structural diagram of an NST is provided based on FIG. 2. FIG. 3 is a schematic flowchart of a method for determining deployment information of a network. Specifically, a process of determining deployment information of a virtual resource of a network slice based on the NST structure is as follows:

Operation S301. A network management device matches a network slice template based on demand information of a network slice and/or an identifier of a network slice template.

The network management device may calculate, based on the demand information of the network slice and a locally stored decomposition algorithm, that a matched identifier of the network slice is the NST 1, or may directly obtain, based on indication information of the network slice, that an identifier of the network slice is the NST 1, where in the NST 1, four pieces of deployment information of the network slice may be included based on different NST 1-NSD deployment flavor identifiers.

Operation S302. The network management device parses the network slice template, and decomposes the demand information of the network slice into demand information of a network slice subnet.

By parsing the NST 1, the network management device may obtain an NSST 1 and an NSST 2. That is, each piece of deployment information of the NST 1 includes an NSST 1 and an NSST 2. Alternatively, identifiers of all network slice subnet templates included in the deployment information of the NST 1 are NSST 1 and NSST 2. In this case, for the NSST 1 and the NSST 2, the network management device may decompose demand information of a network slice into demand information of a network slice subnet, and for example, decomposes demand information of a network slice subnet into demand information of a network slice subnet 1 and demand information of a network slice subnet 2.

Operation S303. The network management device sends a network slice subnet template and the demand information of the network slice subnet to a domain management device.

To determine deployment information of the network slice subnet, the network management device sends the demand information of the network slice subnet 1 and an identifier of the NSST 1 to a domain management device 1 that is associated with the NSST 1, and sends the demand information of the network slice subnet 2 and an identifier of the NSST 2 to a domain management device 2 that is associated with the NSST 2.

Operation S304. The domain management device determines the deployment information of the network slice subnet based on the network slice subnet template and the demand information of the network slice subnet.

The domain management device 1 determines, based on the demand information of the network slice subnet 1, deployment information of the network slice subnet 1 in two pieces of deployment information of the network slice subnet (the NSST 1-NSD Flavor 1 and the NSST 1-NSD Flavor 2) corresponding to the NSST 1. The domain management device 2 determines, based on the demand information of the network slice subnet 2, the deployment information of the network slice subnet 2 in two pieces of deployment information of the network slice subnet (the NSST 2-NSD Flavor 1 and the NSST 2-NSD Flavor 2) corresponding to the NSST 2.

Operation S305. The domain management device sends the deployment information of the network slice subnet to a management and orchestration device.

The domain management device 1 sends the deployment information of the network slice subnet 1 to the management and orchestration device. The domain management device 2 sends the deployment information of the network slice subnet 2 to the management and orchestration device. The management and orchestration device may deploy a virtual resource based on the deployment information of the network slice subnet 1 and the deployment information of the network slice subnet 2.

In the method for determining deployment information of a network described in FIG. 3, the domain management device 1 may send, through an interface between the domain management device 1 and the management and orchestration device, the deployment information of the network slice subnet 1 to the management and orchestration device, the domain management device 2 may alternatively send, through an interface between the domain management device 2 and the management and orchestration device, the deployment information of the network slice subnet 2 to the management and orchestration device, and the management and orchestration device deploys a virtual resource based on the received deployment information of the network slice subnet 1 and deployment information of the network slice subnet 2. However, in the foregoing virtual resource deployment method, the management and orchestration device independently performs virtual resource deployment twice based on the deployment information of the network slice subnet 1 and the deployment information of the network slice subnet 2. Associated deployment information between the network slice subnet 1 and the network slice subnet 2 is lost, for example, a connection relationship between the network slice subnet 1 and the network slice subnet 2, and affinity and anti-affinity information between the network slice subnet 1 and the network slice subnet 1 is lost. Consequently, accuracy of determining deployment information of a network is reduced.

Based on the schematic structural diagram of the network system in FIG. 1, an embodiment of the present disclosure provides a method for determining deployment information of a network, to improve accuracy of determining deployment information of a network.

A main inventive principle of the present disclosure may include: when a network component template is nested in a network template, a first network entity associated with the network template decomposes demand information of a network into demand information of a network component, and sends an identifier of the network component template and the demand information of the network component to a second network entity associated with the network component. The second network entity obtains deployment information of the network component based on the received identifier of the network component template and the demand information of the network component, and sends the deployment information of the network component to the first network entity. When a plurality of network component templates are nested in a network template, a first network entity may receive deployment information of a plurality of network components, and obtain deployment information of a complete network based on the deployment information of the plurality of network components. The deployment information of the network includes association relationships among various network components, and more comprehensive deployment information is included in deployment information sent to a management and orchestration device, so that accuracy of determining deployment information of a network can be improved.

For example, in the network slice structure described in FIG. 2, first, the domain management device 1 determines, based on the demand information of the network slice subnet 1, the deployment information of the network slice subnet 1 in the two pieces of deployment information of the network slice subnet corresponding to the NSST 1, and the domain management device 2 determines, based on the demand information of the network slice subnet 2, the deployment information of the network slice subnet 2 in the two pieces of deployment information of the network slice subnet corresponding to the NSST 2. Second, the domain management device 1 sends the deployment information of the network slice subnet 1 to the network management device, and the domain management device 2 sends the deployment information of the network slice subnet 2 to the network management device. Further, the network management device may determine the deployment information of the network in the deployment information of the network slice included in the network slice template based on an association relationship between the deployment information of the network slice subnet 1 and the deployment information of the network slice, and an association relationship between the deployment information of the network slice subnet 2 and the deployment information of the network slice. Specifically, as shown in FIG. 2, if the deployment information of the network slice subnet 1 is deployment information identified by the NSST 1-NSD Flavor 1, the deployment information of the network slice subnet 2 is deployment information identified by the NSST 2-NSD Flavor 2. After receiving the deployment information identified by the NSST 1-NSD Flavor 1 and the deployment information identified by the NSST 2-NSD Flavor 2, the network management device selects, from deployment information identified by four NST 1-NSD flavors included in the NST 1, an identifier of deployment information that is associated with the NSST 1-NSD Flavor 1 (that is, including an identifier of the NSST 1-NSD Flavor 1), and is associated with the NSST 2-NSD Flavor 2 (that is, including an identifier of the NSST 2-NSD Flavor 2), where the identifier of the deployment information is the deployment information identified by the NST 1-NSD Flavor 2. The deployment information identified by the NST 1-NSD Flavor 2 includes an association relationship between the network slice subnet 1 and the network slice subnet 2, for example, affinity and anti-affinity of deployment of the network slice subnet 1 and the network slice subnet 2, and includes more comprehensive deployment information in the deployment information sent to the management and orchestration device, so that accuracy of determining deployment information of a network can be improved.

Figure 4:
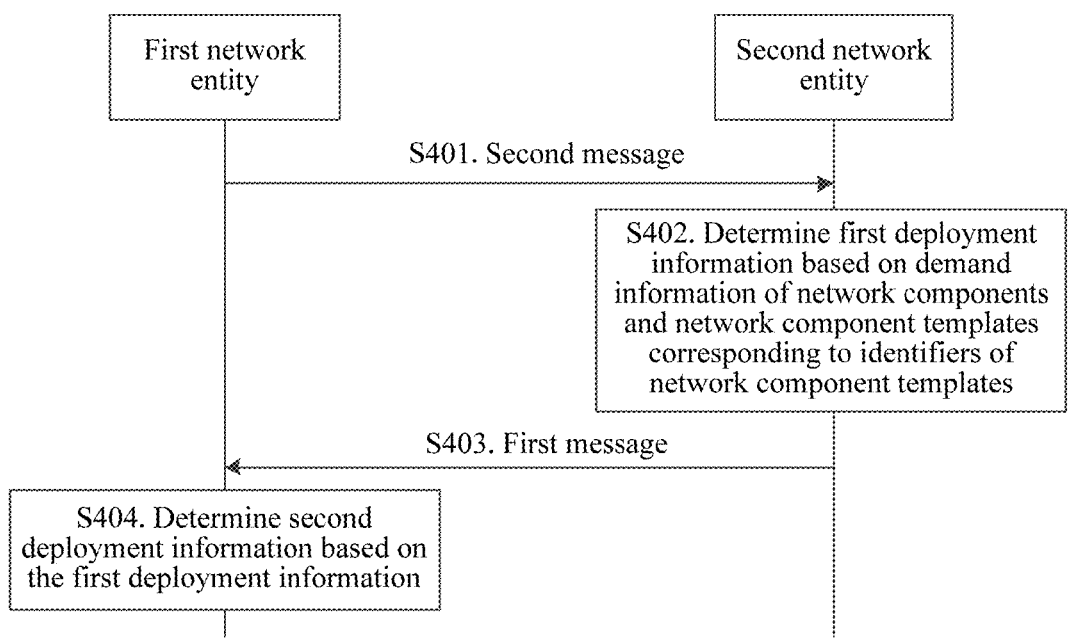
FIG. 4 is a schematic flowchart of a method for determining deployment information of a network according to an embodiment of the present disclosure.

Based on the foregoing main inventive principle, a specific procedure of the method for determining deployment information of a network is described below. FIG. 4 is a schematic flowchart of a method for determining deployment information of a network according to an embodiment of the present disclosure. The method for determining deployment information of a network includes, but is not limited to, the following operations S401 to S404.

Operation S401. A first network entity sends a second message to a second network entity. The second message carries demand information of a network component and an identifier of a network component template.

This embodiment of the present disclosure may be applied to at least the following two scenarios. Scenario 1: A first network entity is a network management device, a second network device is a domain management device, and a third network device is a management and orchestration device. In this scenario, a network component is a network slice subnet, a network component template is a network slice subnet template, a network is a network slice, and a network template is a network slice template. Scenario 2: A first network device is a network management device or a domain management device, a second network device is a network function management device, and a third network device is a management and orchestration device. In this scenario, a network component is a network function, a network component template is a network function template, a network is a network slice or a network slice subnet, and a network template is a network slice template or a network slice subnet template. The two scenarios are separately described in detail below. It may be understood that the method for determining deployment information of a network according to the present disclosure may be applicable to a case in which deployment information of a network is determined when a network slice subnet template is nested in a network template, and is also applicable to a case in which deployment information of a network is determined when no network slice subnet template is nested in a network template.

For the scenario 1, before the network management device sends the first message to the domain management device, the network management device is further configured to perform the following operations:

Operation 1. The network management device receives a network slice request sent by a service management device.

Before the service management device sends the network slice request to the network management device, the service management device may receive a network slice request or a service request, where the network slice request or the service request carries demand information of a network slice and indication information of a network slice template. The service management device may alternatively calculate demand information of a network slice and indication information of a network slice template based on a received service requirement sent by an operator and/or a third-party client, add the demand information of the network slice and/or the indication information of the network slice template into a network slice request, and send the network slice request to the network management device. The network slice request may alternatively directly add the indication information of the network slice template, where the indication information is used to determine the network slice template corresponding to the indication information. The demand information of the network slice reflects a requirement of the operator and/or the third-party client on a function of the network slice. The demand information of the network slice may include one or more of a latency requirement, a bandwidth requirement, a coverage requirement, a user quantity requirement (a capacity requirement), a mobility requirement, a throughput requirement, a reliability requirement, a deployment location requirement, an affinity and anti-affinity requirement, a success rate requirement, and a network slice type requirement.

Operation 2. The network management device obtains the network slice template based on the network slice request.

When the network slice request includes the indication information of the network slice template, for example, an identifier of the network slice template, a prestored network slice template may be obtained based on the indication information of the network slice template. When the network slice request does not include indication information of the network slice template, a corresponding network slice template may be matched based on the demand information of the network slice. A matching process may be calculated by the network management device based on a prestored decomposition algorithm of a network slice template vendor.

Operation 3. The network management device parses the network slice template to obtain an identifier of a network slice subnet template, and decomposes the demand information of the network slice into demand information of a network slice subnet.

The network management device may parse the identifier of the network slice subnet template included in the deployment information of the network slice in the network slice template, to obtain the identifier of the network slice subnet template.

The demand information of the network slice may be carried in the network slice request. Decomposing the demand information of the network slice into the demand information of the network slice subnet may be performed based on a policy or an algorithm indicated by a policy identifier or an algorithm identifier that is preset in the network slice template; or may be performed based on different network domains in a preset proportion; or may be performed based on different network slice subnet templates at a geographic location in a preset proportion, or the like.

For example, the demand information of the network slice is latency, the network slice template includes a network slice subnet template 1, a network slice subnet template 2, and a network slice subnet template 3. The network slice subnet template 1 is an AN part template, the network slice subnet template 2 is a CN part template, and the network slice subnet template 3 is a TN part template. One policy identifier or algorithm identifier is prestored in the network slice template to indicate AN latency:CN latency:TN latency=2:3:5. If latency demand information of a network slice is 10 ms, a result obtained by decomposing the demand information of the network slice based on an allocation proportion corresponding the foregoing policy identifier is: latency demand information of the network slice subnet 1 is 2 ms, latency demand information of the network slice subnet 2 is 3 ms, and latency demand information of the network slice subnet 3 is 5 ms.

For another example, the demand information of the network slice is a quantity of users and distribution regions, and the network slice includes a network slice subnet 1 provided by a vendor 1 and a network slice subnet 2 provided by a vendor 2. Both the network slice subnet 1 and the network slice subnet 2 include an AN part, a CN part, and a TN part. The network slice template locally prestores a policy, which indicates that a network slice subnet template in a region 1 is provided by the vendor 1, and a network slice subnet template in a region 2 is provided by the vendor 2. The region 1 and the region 2 are two regions in Shanghai city. The demand information of the network slice is one million users in Shanghai, where there are 400,000 users in the region 1, and 600,000 users in the region 2. Based on a usage and binding relationship of the foregoing regions and the network slice templates, a result of decomposing the demand information of the network slice, that is, the one million users in Shanghai, is that demand information of the network slice subnet 1 is the 400,000 users, and demand information of the network slice subnet 2 is the 600,000 users. In the present disclosure, the foregoing example is used only for explaining this embodiment of the present disclosure but should not constitute a limitation, and another policy or algorithm may be preset in a network slice template based on a requirement to decompose demand information of a network slice. It may be understood that, demand information of a network slice subnet obtained through decomposition is in a one-to-one correspondence with an identifier of a network slice template obtained through parsing.

A network management device may parse a network slice template to obtain identifiers of one or more network slice subnet templates, and assign demand information of a corresponding network slice subnet to a network slice subnet corresponding to each network slice subnet template. If identifiers of a plurality of network slice subnet templates are parsed out, the identifiers of the plurality of network slice subnet templates and demand information of the corresponding network slice subnets may be separately sent to a plurality of domain management devices, or may be sent to a same domain management device. This is not limited herein.

For the scenario 2, actually, the scenario 2 is specifically divided into two scenarios, that is: a scenario 2a, in which the first network entity is a domain management device, and the second network entity is a network function management device, and in this case, the network is a network slice subnet, the network component is a network function, and the network component template is a network function template; and a scenario 2b, in which the first network entity is a network management device, and the second network entity is a network function management device, and in this case, the network is a network slice, the network component is a network function, and the network component template is a network function template. The scenario 2a is specifically described below. First, when the domain management device receives a message that is sent by the network management device and that carries an identifier of a network slice subnet template and demand information of a network slice subnet, the domain management device may obtain a prestored network slice subnet template based on the identifier of the network slice subnet template. If a message sent by the network management device does not include an identifier of a network slice subnet template, a corresponding network slice subnet template may be matched based on demand information of a network slice subnet template. A matching process may be calculated by the domain management device based on a prestored decomposition algorithm of a network slice subnet template vendor, and both the decomposition algorithm and the decomposition algorithm in the scenario 1 are preset by the vendor, and may be preset based on different functions in specific cases. Second, the domain management device parses the network slice subnet template to obtain an identifier of a network function template, and decomposes the demand information of the network slice subnet into demand information of a network function. The demand information of the network slice subnet may be carried in a message sent by the network management device, and when a message sent by the network management device does not carry the demand information of the network slice subnet, the demand information of the network slice subnet may be carried in an obtained network slice subnet template. Decomposing the demand information of the network slice subnet into the demand information of the network function may be performed based on a policy or an algorithm indicated by a policy identifier or an algorithm identifier that are preset in the network slice subnet template; specifically, may be performed based on different network functions in a preset proportion; or may be performed based on different network function templates at a geographic location in a preset proportion, or the like.

The scenario 2b is specifically described below. After obtaining the network slice template, the network management device parses the network slice template to obtain the identifier of the network function template, and decomposes the demand information of the network slice into the demand information of the network function. The network management device may parse the identifier of the network function template included in the deployment information of the network slice in the network slice template, to obtain the identifier of the network function template. The demand information of the network slice may be carried in the network slice request, and when the network slice request does not carry the demand information of the network slice, the demand information of the network slice may be carried in an obtained network slice template. Decomposing the demand information of the network slice into the demand information of the network function may be performed based on a policy or an algorithm indicated by a policy identifier or an algorithm identifier that are preset in network slice template; may be performed based on different network functions in a preset proportion; or may be performed based on different network function templates at a geographic location in a preset proportion, or the like.

Operation S402. The second network entity determines first deployment information based on the demand information of the network component and a network component template corresponding to the identifier of the network component template. The first deployment information is deployment information of the network component.

For the scenario 1, the domain management device may be associated with a plurality of network slice subnet templates, and determine, based on an identifier of a network slice subnet template, a network slice subnet template corresponding to the identifier. A network slice subnet template may include deployment information of at least one network slice subnet. Determining, by the domain management device, deployment information of a network slice subnet based on demand information of the network slice subnet and the network slice subnet template corresponding to the identifier of the network slice subnet template, includes:

determining, by the domain management device, deployment information of the network slice subnet in deployment information of at least one network slice subnet based on the demand information of the network slice subnet. A determining process may be calculated based on a decomposition algorithm locally prestored in the network slice subnet template, or may be obtained through another method. For example, the determining process is obtained based on a preset mapping relationship between demand information of a network slice subnet and deployment information of the network slice subnet. This is not limited in this embodiment.

The foregoing method describes a scenario in which deployment information of a network slice subnet is included in a network slice subnet template. Actually, partial information in the deployment information of the network slice subnet may also be calculated by the domain management device by invoking a local policy or algorithm. For example, the partial information is position constraint information calculated based on a latency requirement.

Deployment information of a network slice subnet may include: a virtual resource descriptor identifier corresponding to the network slice subnet and/or an identifier of a virtual resource deployment flavor corresponding to the network slice subnet. Deployment information of a virtual resource corresponding to a network slice subnet may further include one or more of the following: a virtual resource instantiation level corresponding to the network slice subnet, affinity and anti-affinity of deployment of the network slice subnet, deployment location constraint information of the network slice subnet, and the like.

For the scenario 2, the network function management device may be associated with a plurality of network function templates, and determine, based on an identifier of a network function template, the network function template corresponding to the identifier. A network function template may include deployment information of at least one network function; and determining, by the network function management device, deployment information of the network function based on the demand information of the network function and the network function template corresponding to the identifier of the network function template includes: determining, by the network function management device, deployment information of the network function in the deployment information of at least one network function based on the demand information of the network function. A determining process may be calculated based on a decomposition algorithm locally prestored in a network function template, or may be obtained through another method. For example, the determining process is obtained based on a preset mapping relationship between demand information of a network function and deployment information of the network function. This is not limited in this embodiment.

The foregoing method describes a scenario in which deployment information of a network function is completely included in a network function template. Actually, partial information of deployment information of a network function may also be calculated by the network function management device by invoking an algorithm.

Deployment information of a network function may include: a virtual resource descriptor identifier corresponding to the network function, and/or an identifier of a virtual resource deployment flavor corresponding to the network function. The virtual resource descriptor identifier corresponding to the network function may be an NFD ID, and the identifier of the virtual resource deployment flavor corresponding to the network function is an NFD Flavor ID. Deployment information of a network function may further include one or more of the following: a virtual resource instantiation level corresponding to the network function, affinity and anti-affinity of deployment of a virtual resource of the network function, deployment location constraint information of the network function.

Operation S403. The second network entity sends a first message to the first network entity, where the first message carries first deployment information.

For the scenario 1, the domain management device may send one or more pieces of deployment information of a network slice subnet to the network management device. When there are a plurality of pieces of deployment information of a network slice subnet, the plurality of pieces of deployment information of the network slice subnet may be sent by a same domain management device, or may be sent by different domain management devices. This is not limited herein. It may be understood that, the quantity of pieces of deployment information of a network slice subnet is equal to the quantity of identifiers of the network slice subnet template parsed out by the network management device in operation S401. Certainly, the quantity of pieces of the deployment information of the network slice subnet is also equal to the quantity of pieces of the demand information of the network slice subnet obtained by the network management device by decomposing the demand information of the network slice. As shown in FIG. 2, for a process of determining the deployment information of the network slice subnet based on the demand information of the network slice and the identifier of the network slice, refer to the embodiment described in FIG. 3.

Figure 5:
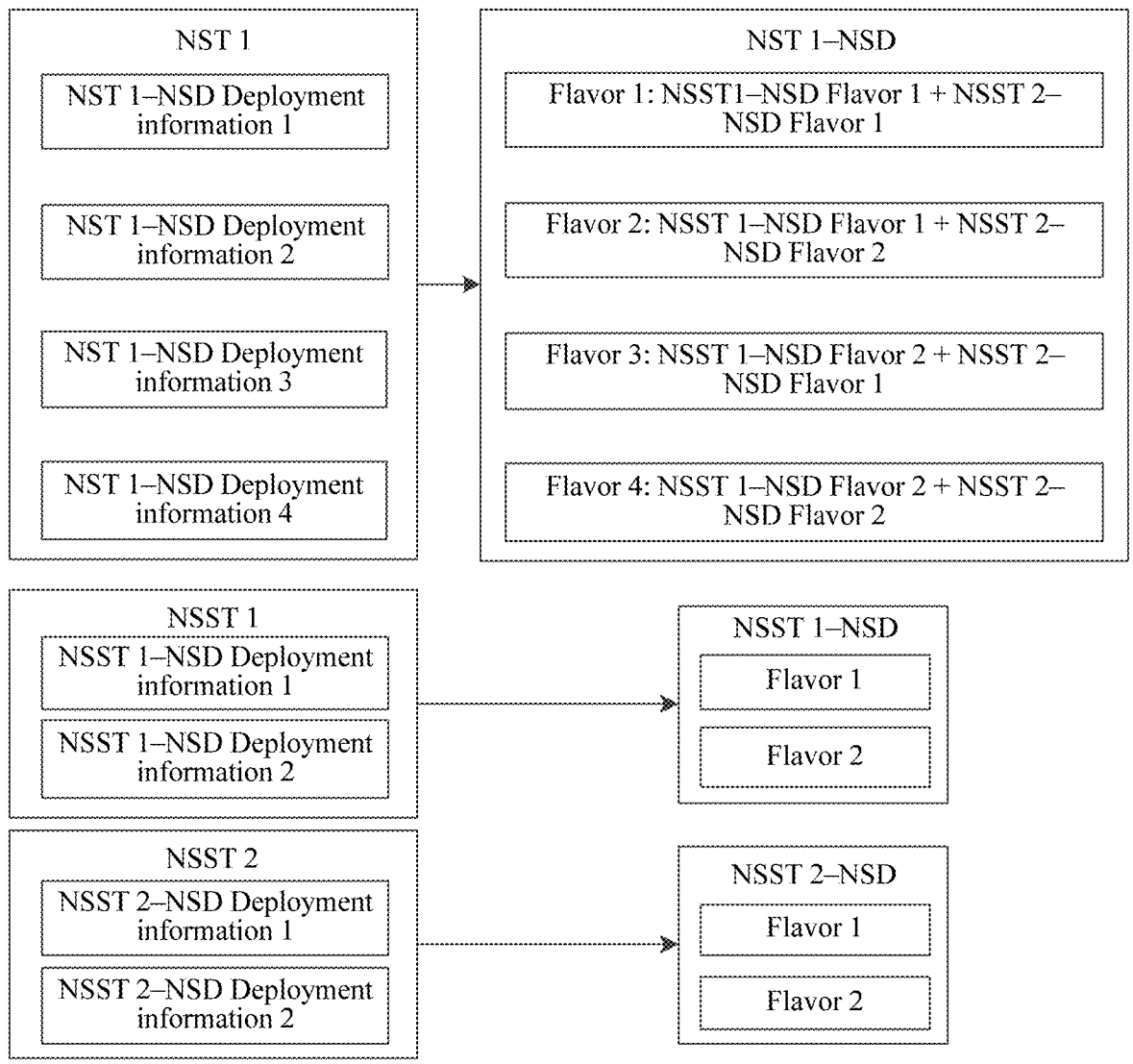
FIG. 5 is a schematic structural diagram of another NST and another NSST according to an embodiment of the present disclosure.

In addition, deployment information of a network slice subnet and deployment information of a network slice may also be prestored. FIG. 5 is a schematic structural diagram of another NST and another NSST according to an embodiment of the present disclosure. As shown in FIG. 5, deployment information included in each of an NSST 1, an NSST 2, and an NST 1 may be prestored in a database for calling. Only an identifier of deployment information may be stored and used for indicating the deployment information. A network management device parses the network slice template NST 1, to obtain the network slice template NST 1 that includes the network slice subnet template NSST 1 and the NSST 2. The network management device sends an identifier of the network slice subnet template NSST 1 and demand information of the network slice subnet template NSST 1 to a corresponding domain management device, and sends an identifier of the network slice subnet template NSST 2 and demand information of the network slice subnet template NSST 2 to a corresponding domain management device. The domain management devices herein may be a same domain management device, or may be different domain management devices. The domain management device obtains deployment information of a network slice subnet 1 based on the identifier of the network slice subnet template NSST 1 and the demand information of the network slice subnet template NSST 1. The domain management device obtains deployment information of a network slice subnet 2 based on the identifier of the network slice subnet template NSST 2 and the demand information of the network slice subnet template NSST 2. As shown in FIG. 5, the domain management device directly matches, based on the demand information of the network slice subnet 1, deployment information 1 of the NSST 1 from the prestored deployment information of the network slice subnet 1. The domain management device directly matches, based on the demand information of the network slice subnet 2, deployment information 1 of the NSST 2 from the prestored deployment information (NSST 2) of the network slice subnet 2.

For the scenario 2a, the network function management device may send one or more pieces of deployment information of a network function to the domain management device or the network management device. When there are a plurality of pieces of deployment information of a network function, the plurality of pieces of deployment information of the network function may be sent by a same network function management device, or may be sent by different network function management devices. This is not limited herein. It may be understood that, a quantity of pieces of the deployment information of the network function is equal to a quantity of identifiers of the network function template parsed out in operation S401. Certainly, a quantity of pieces of the deployment information of the network function is also equal to a quantity of pieces of the demand information of the network function obtained by decomposing the demand information of the network slice subnet or the demand information of the network slice.

Figure 6:
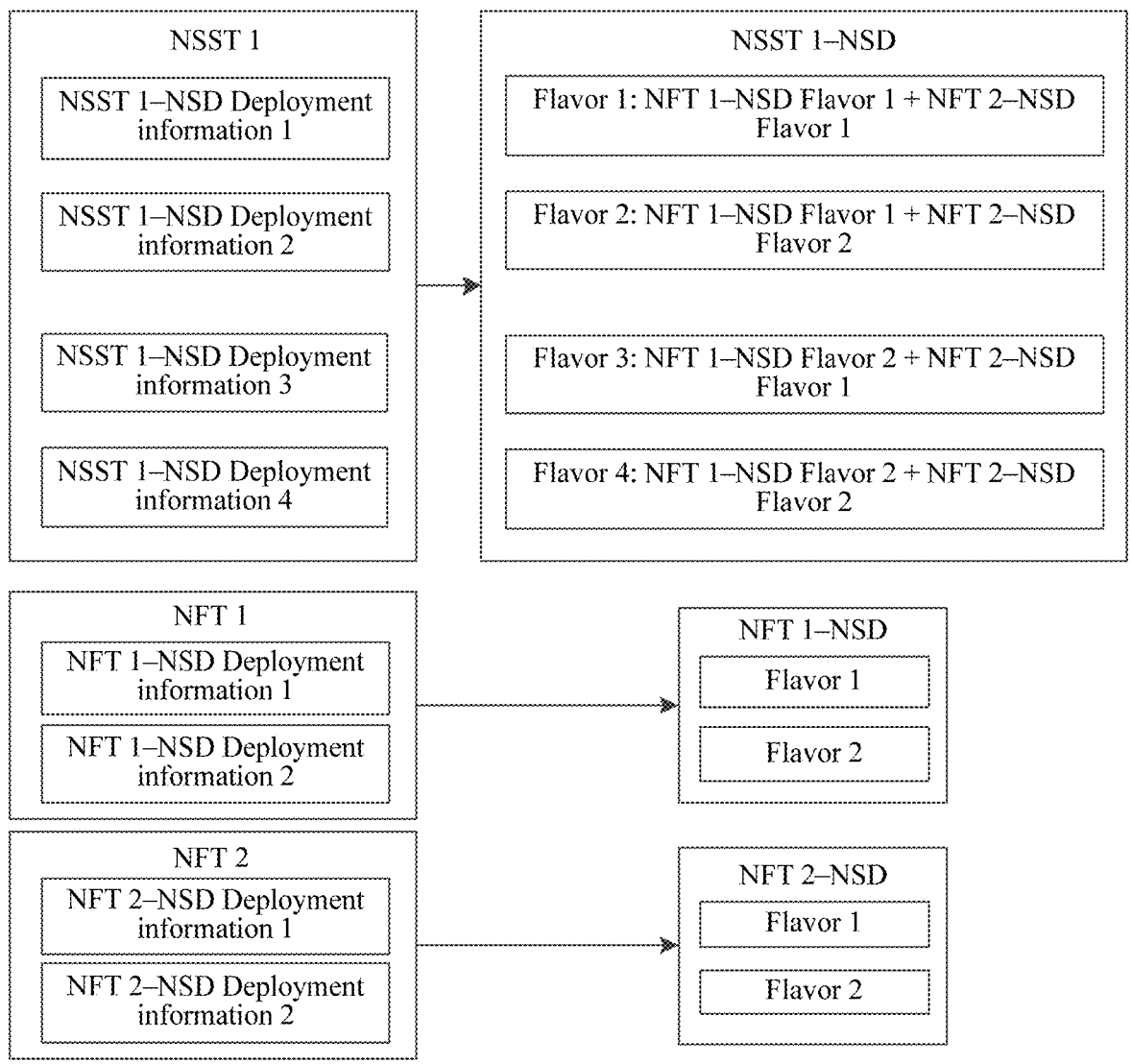
FIG. 6 is a schematic structural diagram of an NSST and an NFT according to an embodiment of the present disclosure.

The deployment information of the network function may be prestored, or may be matched from prestored deployment information of the network function based on the demand information of the network function. Specifically, FIG. 6 is a schematic structural diagram of an NSST and an NFT according to an embodiment of the present disclosure. Deployment information included in each of an NFT 1, an NFT 2, and an NSST 1 may be prestored in a database for calling. Only an identifier of deployment information may be stored and used for indicating corresponding deployment information. The domain management device parses the network slice subnet template NSST 1, to obtain the network slice subnet template NSST 1 that includes the network function template NFT 1 and the NFT 2. The domain management device sends an identifier of the network function template NFT 1 and demand information of the network function template NFT 1 to a corresponding network function management device, and sends an identifier of the network function template NFT 2 and demand information of the network function template NFT 2 to a corresponding network function management device. The network function management devices herein may be a same network function management device, or may be different network function management devices. The network function management device obtains deployment information of a network function 1 based on the identifier of the network function template NFT 1 and the demand information of the network function template NFT 1. The network function management device obtains deployment information of a network function 2 based on the identifier of the network function template NFT 2 and the demand information of the network function template NFT 2. As shown in FIG. 6, the network function management device directly matches, based on demand information of the network function 1, deployment information 1 about the NFT 1 from the prestored deployment information of the network function 1. The network function management device directly matches, based on demand information of the network function 2, deployment information 1 about the NFT 2 from the prestored deployment information (NFT 2) about the network function 2.

Figure 7:
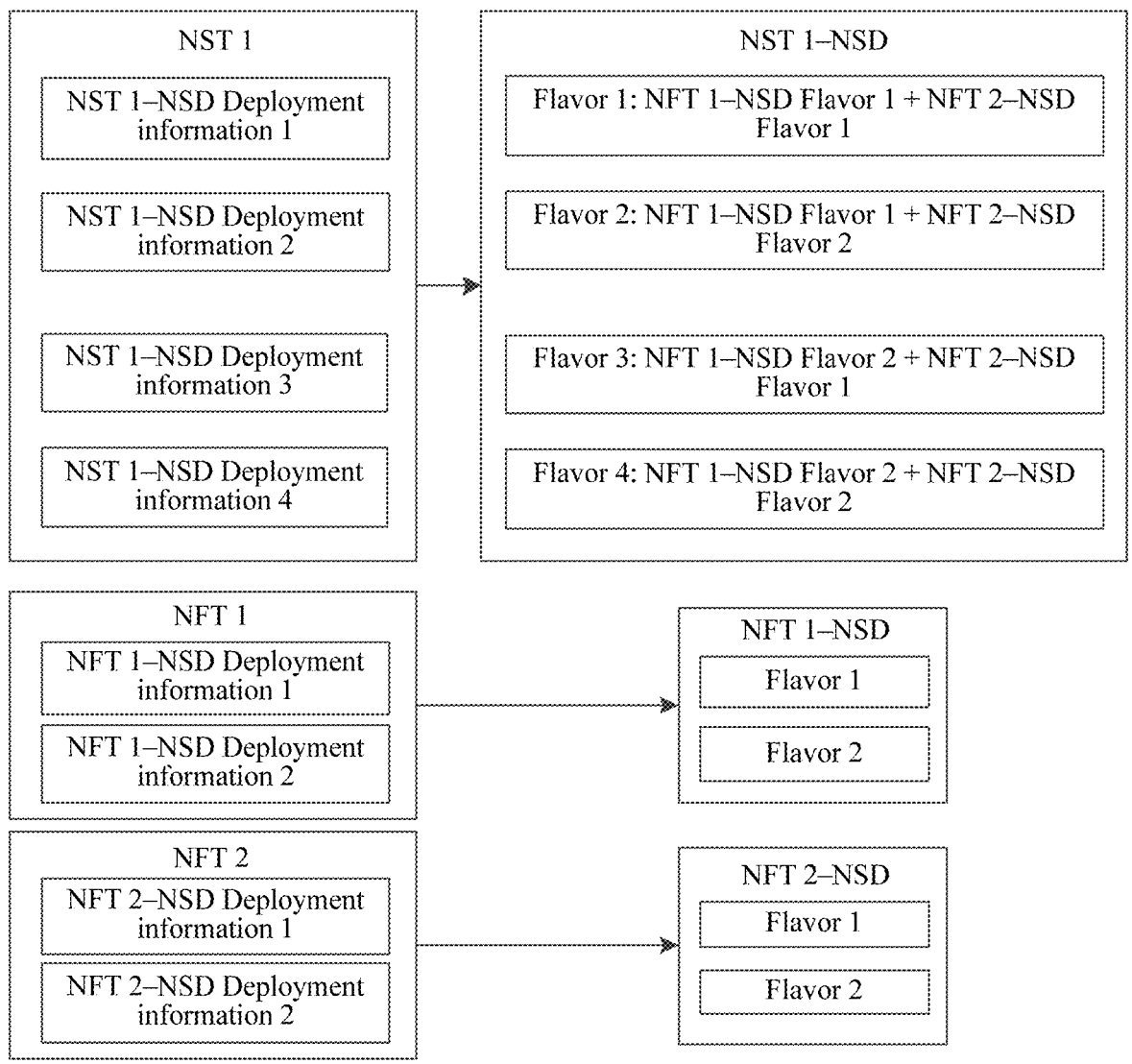
FIG. 7 is a schematic structural diagram of an NST and an NFT according to an embodiment of the present disclosure.

For the scenario 2b, the network function management device may send one or more pieces of deployment information of a network function to the network management device. When there are a plurality of pieces of deployment information of a network function, the plurality of pieces of deployment information of the network function may be sent by a same network function management device, or may be sent by different network function management devices. This is not limited herein. It may be understood that, a quantity of pieces of deployment information of the network function is equal to a quantity of identifiers of the network function template parsed out in operation S401. Certainly, a quantity of pieces of deployment information of the network function is also equal to a quantity of pieces of the demand information of the network function obtained by decomposing the demand information of the network slice subnet or the demand information of the network slice. The deployment information of the network function may be prestored, or may be obtained from prestored deployment information of the network function based on the demand information of the network function. Specifically, FIG. 7 is a schematic structural diagram of an NST and an NFT according to an embodiment of the present disclosure. Deployment information included in each of an NFT 1, an NFT 2, and an NST 1 may be prestored in a database for calling. Only an identifier of deployment information may be stored and used for indicating corresponding deployment information. A network management device parses the network slice template NST 1, to obtain the network slice template NST 1 that includes the network function template NFT 1 and the NFT 2. The network management device sends an identifier of the network function template NFT 1 and demand information of network function 1 to a corresponding network function management device, and sends an identifier of the network function template NFT 2 and demand information of the network function 2 to a corresponding network function management device. The network function management devices herein may be a same network function management device, or may be different network function management devices. The network function management device obtains deployment information of a network function 1 based on the identifier of the network function template NFT 1 and the demand information of the network function template NFT 1. The network function management device obtains deployment information of a network function 2 based on the identifier of the network function template NFT 2 and the demand information of the network function template NFT 2. As shown in FIG. 6, the network function management device directly matches, based on demand information of the network function 1, deployment information 1 about the NFT 1 from the prestored deployment information of the network function 1. The network function management device directly matches, based on demand information of the network function 2, deployment information 1 about the NFT 2 from the prestored deployment information (NFT 2) about the network function 2.

Operation S404. The first network entity determines second deployment information based on the first deployment information, where the second deployment information is deployment information of a network.

For the scenario 1, the network management device may obtain deployment information of a network slice based on received deployment information of at least one network slice subnet. The network management device may determine, based on an association relationship between the deployment information of the at least one network slice subnet and the deployment information of the network slice, the deployment information of the network in the deployment information of the network slice included in a network slice template. As shown in FIG. 2, if the network management device receives deployment information of two network slice subnets, where an ID of an NSST-NSD flavor included in deployment information of one network slice subnet is NSST 1-NSD Flavor 1, and an ID of an NSST-NSD flavor included in deployment information of another network slice subnet is NSST 2-NSD Flavor 2, the network management device may calculate, based on the deployment information of the two network slice subnets, that the deployment information of the network slice is NST 1-NSD Flavor 2.

In addition, prestored deployment information of a network slice may be prestored in a network template, or may be locally prestored in the network management device. As shown in FIG. 5, the deployment information of the network slice includes: NST 1-NSD Deployment information 1, NST 1-NSD Deployment information 2, NST 1-NSD Deployment information 3, and NST 1-NSD Deployment information 4. Deployment information of these network slices may be prestored in a database. When receiving deployment information of two network slice subnets, the network management device selects, from the four types of deployment information of the network slices, deployment information of a network slice including the NSST 1 NSD Flavor 1 and the NSST 2-NSD Flavor 2 based on the NSST 1-NSD Flavor 1 and the NSST 2-NSD Flavor 2. As shown in FIG. 5, deployment information of a network slice indicated by an NST 1-NSD flavor ID as the NST 1-NSD Flavor 2 includes the NSST 1-NSD Flavor 1 and NSST 2-NSD Flavor 2. The NST 1-NSD Deployment information 2 includes the NST 1-NSD Flavor 2. Therefore, it may be determined that the deployment information of the network slice is the NST 1-NSD Deployment information 2. In the deployment information of the network slice that is the NST 1-NSD Deployment information 2, information apart from an NSST 1-NSD flavor ID is included. For example, the information may be one or more of the following, and the following information may not be included in the NST 1, and may be calculated based on demand information of the network slice: a virtual resource instantiation level of a network slice 1, affinity and anti-affinity of a virtual resource of a network slice 1, deployment location constraint information of a network slice 1, and the like. The foregoing example is only used to explain this embodiment of the present disclosure, and should not constitute a limitation.

Deployment information of a network slice subnet may include: a virtual resource descriptor identifier corresponding to the network slice subnet, and/or an identifier of a virtual resource deployment flavor corresponding to the network slice subnet. The deployment information of the network slice subnet may further include at least one of the following information, which may not be included in an NSST, and may be calculated based on the demand information of the network slice subnet: a virtual resource instantiation level corresponding to the network slice subnet, affinity and anti-affinity of deployment of a virtual resource corresponding to the network slice subnet, and virtual resource deployment location constraint information corresponding to the network slice subnet. Deployment information of a network slice may include: a virtual resource descriptor identifier corresponding to the network slice, and/or an identifier of a virtual resource deployment flavor corresponding to the network slice. The deployment information of the network slice subnet may further include at least one of the following information, which may not be included in an NST, and may be calculated based on the demand information of the network slice subnet: a virtual resource instantiation level corresponding to the network slice, affinity and anti-affinity of deployment of a virtual resource corresponding to the network slice, and virtual resource deployment location constraint information corresponding to the network slice. After the network management device sends the foregoing deployment information of the network slice to a management and orchestration device, the management and orchestration device deploys a virtual resource based on the deployment information of the network slice, and forms a network slice instance after instantiation.

In a running process of the network slice instance, when detecting that the network slice subnet satisfies a preset condition, the domain management device determines deployment information based on the preset condition; and the domain management device sends the deployment information of the network slice subnet to the network management device.

The foregoing preset condition may be that a quantity of users carried on the network slice subnet is greater than a preset threshold. The network slice subnet herein is a network slice subnet instance after instantiation. The preset threshold may be a requirement on a quantity of users in received demand information of a network slice subnet when the deployment information of the network slice subnet is obtained, or may be preset in the network slice subnet. For example, if the requirement on the quantity of users in the received demand information of the network slice subnet is one million users, when a quantity of users carried on the network slice subnet deployed based on the demand information of the network slice subnet exceeds one million, the network slice subnet cannot be overloaded. The foregoing preset threshold may be set to one million. When a quantity of users exceeds one million, the domain management device is triggered to send the deployment information of the network slice subnet to the network management device, and send the deployment information of the network slice subnet to the network management device. The network management device obtains fourth deployment information of the network slice based on the deployment information of the network slice subnet, and sends the fourth deployment information of the network slice to the management and orchestration device, to request the management and orchestration device to perform instantiation based on the fourth deployment information of the network slice. An instantiated network slice instance can be used for carrying an extra quantity of users. It may also be that the domain management device sends the deployment information of the network slice subnet to the management and orchestration device to perform instantiation.

For another example, based on a capacity of carrying a quantity of users, when the quantity of users exceeds 800,000, the network slice subnet cannot be overloaded when a quantity of users carried on the network slice based on demand information of the network slice subnet exceeds a preset threshold 800,000. The foregoing preset threshold may be set to 800,000. When a quantity of users exceeds 800,000, the domain management device is triggered to send the deployment information of the network slice subnet to the network management device, and send the deployment information of the network slice subnet to the network management device. The network management device obtains fourth deployment information of the network slice based on the deployment information of the network slice subnet, and sends the fourth deployment information of the network slice to the management and orchestration device, to request the management and orchestration device to perform instantiation based on the fourth deployment information of the network slice. An instantiated network slice instance can be used for carrying an extra quantity of users.

In addition, a preset condition may further be that the domain management device managing a network slice subnet is faulty. The faulty domain management device losses control of the network slice subnet, and needs to redeploy a network slice subnet instance. It may also be that the domain management device triggers an updated network slice subnet based on some other policies internally set. It may be understood that, in a running process of a network slice or a network slice subnet, if a case in which the network slice or the network slice subnet needs to be redeployed or updated occurs, the case is included in this embodiment of the present disclosure. In this embodiment of the present disclosure, a problem in running of a network slice or a network slice subnet can be resolved by redeploying or updating the network slice or the network slice subnet.

In this embodiment of the present disclosure, after determining the deployment information of the network slice based on the deployment information of the network slice subnet, the network management device sends a request carrying the deployment information of the network slice to the management and orchestration device, and when receiving the request carrying the deployment information of the network slice, the management and orchestration device deploys a virtual resource of the network slice based on the deployment information of the network slice.

In this embodiment of the present disclosure, when a network slice subnet template is nested in a network slice template, after determining the deployment information of the network slice subnet, the domain management device does not directly send the deployment information of the network slice subnet to the management and orchestration device managing a network virtual resource to perform instantiation, but sends the deployment information of the network slice subnet to the network management device. The network management device obtains, based on deployment information of at least one network slice subnet, deployment information of a complete network slice including the deployment information of the at least one network slice subnet and an association relationship between the deployment information of the at least one network slice subnet. The deployment information of the complete network slice corresponding to demand information of the network slice is obtained. The deployment information of the complete network slice includes an association relationship between deployment information of network slice subnets, and more comprehensive deployment information is included in deployment information sent to the network management device, so that accuracy of determining deployment information of a network slice can be improved.

For the scenario 2, the domain management device or the network management device may obtain deployment information of a network slice based on received deployment information of at least one network function. For the scenario 2a, as shown in FIG. 6, if a domain management device receives deployment information of two network functions, where an NFT-NSD flavor ID included in deployment information of one network function is NFT 1-NSD Flavor 1, and an NFT-NSD flavor ID included in deployment information of the other network function is NFT 1-NSD Flavor 2, so that the domain management device can calculate deployment information of a network slice subnet based on deployment information of the two NFs. In addition, the deployment information may alternatively be deployment information of a prestored network slice subnet. As shown in FIG. 6, the deployment information of the network slice subnet includes: NSST 1-NSD Deployment information 1, NSST 1-NSD Deployment information 2, NSST 1-NSD Deployment information 3, and NSST 1-NSD Deployment information 4. The deployment information of these network slice subnets may be prestored in a database. When receiving deployment information of two NFs, the domain management device selects, based on the NFT 1-NSD Flavor 1, the NFT 2-NSD Flavor 2, and an association relationship of the four types of deployment information of the network slice subnet, deployment information of a network slice subnet including the foregoing NFT 1-NSD Flavor 1 and NFT 2-NSD Flavor 2 from the deployment information of the two NFs. As shown in FIG. 6, deployment information of a network slice subnet indicated by an NSST 1-NSD flavor ID as the NSST 1-NSD Flavor 2 includes the foregoing NFT 1-NSD Flavor 1 and NFT 2-NSD Flavor 2. The NSST 1-NSD Deployment information 2 includes the NSST 1-NSD Flavor 2. Therefore, it may be determined that the deployment information of the network slice subnet is the NSST 1-NSD Deployment information 2. The deployment information of the network slice subnet that is the NSST 1-NSD Deployment information 2 may further include information other than an NSST 1-NSD flavor ID. For example, the information may be one or more of the following, and the following information may not be included in the NSST 1, and may be calculated based on demand information of the network slice subnet: a virtual resource instantiation level of the network slice subnet 1, affinity and anti-affinity of a virtual resource of the network slice subnet 1, deployment location constraint information of the network slice subnet 1, and the like. The foregoing example is only used to explain this embodiment of the present disclosure, and should not constitute a limitation.

Deployment information of a network function may include: a virtual resource descriptor identifier corresponding to the network function, and an identifier of a virtual resource deployment flavor corresponding to the network function. The deployment information of the network function may further include at least of one the following, and the following information may not be included in an NFT, and may be calculated based on demand information of the network function: a virtual resource instantiation level corresponding to the network function, affinity and anti-affinity of deployment of a virtual resource corresponding to the network function, and virtual resource deployment location constraint information corresponding to the network function. Deployment information of a network slice subnet may include: a virtual resource descriptor identifier corresponding to the network slice subnet and/or an identifier of a virtual resource deployment flavor corresponding to the network slice subnet. Deployment information of a network slice subnet may further include at least one of the following, and the following information may not be included in an NSST, and may be calculated based on the demand information of the network slice subnet: a virtual resource instantiation level corresponding to the network slice subnet, affinity and anti-affinity of deployment of a virtual resource corresponding to the network slice subnet, virtual resource deployment location constraint information corresponding to the network slice subnet.

After a domain management device calculates deployment information of a network slice subnet based on deployment information of a network function, the deployment information of the network slice subnet is nested in deployment information of the network slice, and then the domain management device needs to send the deployment information of the network slice subnet to a network management device, and perform a procedure of the scenario 1 in operation S404 and a subsequent procedure.

In the foregoing scenario 2a, when a network function template is nested in a network slice subnet template, a domain management device associated with the network slice subnet template decomposes demand information of the network slice subnet into demand information of a network function, and sends an identifier of the network function template and the demand information of the network function to a network function management device associated with the network function. The network function management device obtains deployment information of the network function based on a received identifier of the network function template and demand information of the network function, and sends the deployment information of the network function to the domain management device. When a plurality of network function templates are nested in the network slice subnet template, the domain management device may receive deployment information of a plurality of network functions, and obtain deployment information of a complete network slice subnet based on the deployment information of the plurality of network functions. The deployment information of the network slice subnet includes association relationships among various network functions, and more comprehensive deployment information is included in deployment information sent to a network management device, so that accuracy of determining the deployment information of the network slice can be improved.

For the scenario 2b, as shown in FIG. 7, if the network management device receives deployment information of two network functions, where an NFT-NSD flavor ID included in deployment information of one network function is NFT 1-NSD Flavor 1, and an NFT-NSD flavor ID included in deployment information of the other NF is NFT 2-NSD Flavor 2, so that the network management device can calculate deployment information of a network slice based on the deployment information of the two NFs. In addition, the deployment information may be prestored deployment information of a network slice. As shown in FIG. 7, the deployment information of the network slice subnet includes: NST 1-NSD Deployment information 1, NST 1-NSD Deployment information 2, NST 1-NSD Deployment information 3, and NST 1-NSD Deployment information 4. These deployment information of the network slice may be prestored in a database. When receiving deployment information of two NFs, the network management device selects, based on the NFT 1-NSD Flavor 1, the NFT 2-NSD Flavor 2, and an association relationship of the four types of deployment information of the network slice, deployment information of a network slice including the NFT 1-NSD Flavor 1 and NFT 2-NSD Flavor 2 from the deployment information of the two NFs. As shown in FIG. 7, deployment information of a network slice indicated by an NST 1-NSD flavor ID as the NST 1-NSD Flavor 2 includes the NFT 1-NSD Flavor 1 and NFT 2-NSD Flavor 2. The NST 1-NSD Deployment information 2 includes the NST 1-NSD Flavor 2. Therefore, it may be determined that the deployment information of the network slice subnet is the NST 1-NSD Deployment information 2. The deployment information of the network slice subnet that is the NST 1-NSD Deployment information 2 includes information other than an NST 1-NSD flavor ID. For example, the information may be one or more of the following, and the following information may not be included in the NST 1, and may be calculated based on demand information of the network slice: a virtual resource instantiation level of a network slice 1, affinity and anti-affinity of a virtual resource of a network slice 1, deployment location constraint information of a network slice 1, and the like. The foregoing example is only used to explain this embodiment of the present disclosure, and should not constitute a limitation.

Deployment information of a network function may include: a virtual resource descriptor identifier corresponding to the network function, and an identifier of a virtual resource deployment flavor corresponding to the network function. Deployment information of a network function may further include at least of one the following, and the following information may not be included in an NFT, and may be calculated based on demand information of the network function: a virtual resource instantiation level corresponding to the network function, affinity and anti-affinity of deployment of a virtual resource corresponding to the network function, and virtual resource deployment location constraint information corresponding to the network function. Deployment information of a network slice subnet may include: a virtual resource descriptor identifier corresponding to the network slice subnet, and/or an identifier of a virtual resource deployment flavor corresponding to the network slice subnet. Deployment information of a network slice subnet may further include at least one of the following, and the following information may not be included in an NSST, and may be calculated based on the demand information of the network slice subnet: a virtual resource instantiation level corresponding to the network slice subnet, affinity and anti-affinity of deployment of a virtual resource corresponding to the network slice subnet, virtual resource deployment location constraint information corresponding to the network slice subnet.

After calculating deployment information of a network slice based on deployment information of a network function, the network management device may send the deployment information of the network slice to the management and orchestration device, and the management and orchestration device deploys a virtual resource of the network slice based on the deployment information of the network slice.

In the foregoing scenario 2b, when a network function template is nested in a network slice template, a network management device associated with the network slice template decomposes demand information of the network slice into demand information of a network function, and sends an identifier of the network function template and the demand information of the network function to a network function management device associated with the network function. The network function management device obtains deployment information of the network function based on a received identifier of the network function template and demand information of the network function, and sends the deployment information of the network function to the network management device. When a plurality of network function templates are nested in the network slice template, the network management device may receive deployment information of a plurality of network functions, and obtain deployment information of a complete network slice based on the deployment information of the plurality of network functions, where the deployment information of the network slice includes association relationships among various network functions, and more comprehensive deployment information is included in deployment information sent to a management and orchestration device, so that accuracy of determining the deployment information of the network slice can be improved.

The method in the embodiments of the present disclosure is described above in detail, and a network entity in the embodiments of the present disclosure is provided below.

Figure 8:
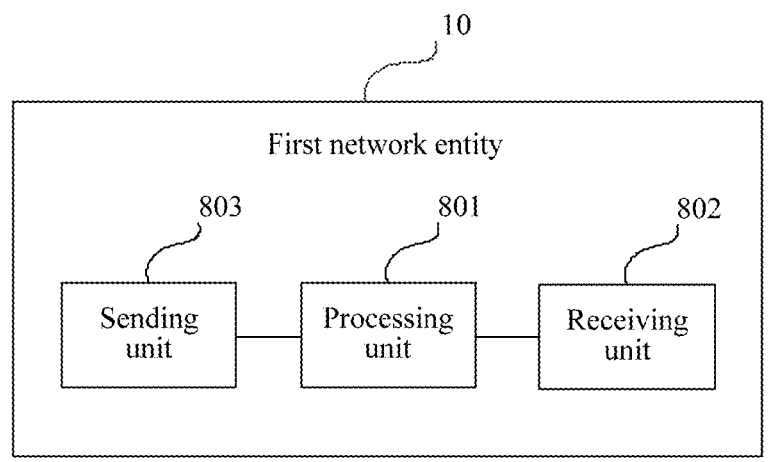
FIG. 8 is a schematic structural diagram of a network entity 10 according to an embodiment of the present disclosure.

Based on a network system architecture of FIG. 1, FIG. 8 is a schematic structural diagram of a network entity 10 according to an embodiment of the present disclosure. As shown in FIG. 7, the first network entity 10 may include a processing unit 801 and a receiving unit 802, where the receiving unit 802 is configured to receive a first message sent by a second network entity 20, where the first message carries first deployment information, and the first deployment information is deployment information of a network component; and the processing unit 801 is configured to determine second deployment information based on the first deployment information, where the second deployment information is deployment information of a network, and the network includes at least one network component.

In one embodiment, determining, by the processing unit 801, second deployment information based on the first deployment information includes:

determining, by the processing unit 801, the second deployment information in a network template based on the first deployment information, where the network template includes deployment information of at least one network.

In one embodiment, the first network entity 10 further includes a sending unit 803, where before the processing unit 801 invokes the receiving unit 802 to receive the first message sent by the second network entity, the processing unit 801 is further configured to invoke the sending unit 803 to send a second message to the second network entity, where the second message carries demand information of the network component and an identifier of a network component template, and demand information of the network component and an identifier of the network component template are used to determine the first deployment information.

In one embodiment, the first deployment information includes at least one of the following: a virtual resource descriptor identifier corresponding to the network component, a virtual resource deployment flavor corresponding to the network component, a virtual resource instantiation level corresponding to the network component, affinity and anti-affinity of virtual resource deployment corresponding to the network component, and virtual resource deployment location constraint information corresponding to the network component; and the second deployment information includes at least one of the following: a virtual resource descriptor identifier corresponding to the network, a virtual resource deployment flavor corresponding to the network, a virtual resource instantiation level corresponding to the network, affinity and anti-affinity of virtual resource deployment corresponding to the network, and virtual resource deployment location constraint information corresponding to the network.

In one embodiment, the network component is a network slice subnet, the network component template is a network slice subnet template, and the network is a network slice. The first network entity 10 is a network management device.

In one embodiment, the network component is a network function, the network component template is a network function template, and the network is a network slice or a network slice subnet. The first network entity 10 is a network management device or a domain management device.

In one embodiment, after the processing unit 801 determines the second deployment information based on the first deployment information, the sending unit 803 is further configured to send a third message carrying the second deployment information to a third network entity.

In this embodiment, for functions of the processing unit 801, the receiving unit 802, and the sending unit 803, a reference can be made to corresponding description of an embodiment about a method for determining deployment information of a network shown in FIG. 4.

Figure 9:
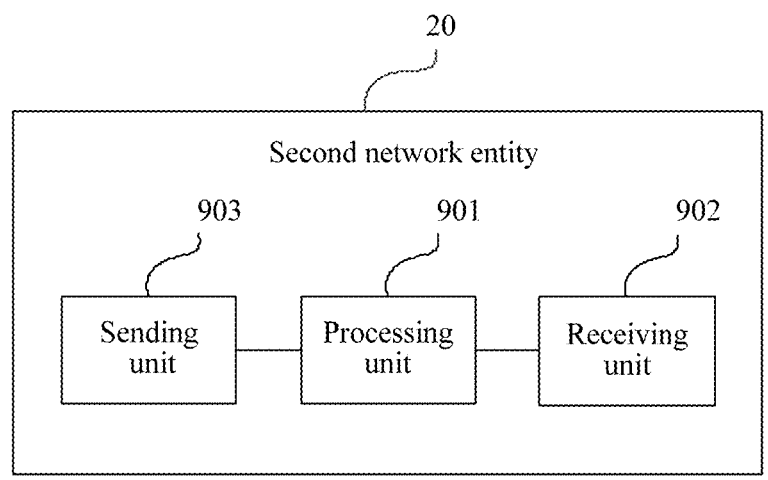
FIG. 9 is a schematic structural diagram of a network entity 20 according to an embodiment of the present disclosure.

Based on a network system architecture of FIG. 1, FIG. 9 is a schematic structural diagram of a network entity 20 according to an embodiment of the present disclosure. As shown in FIG. 9, the second network entity 20 may include a processing unit 901, a receiving unit 902, and a sending unit 903, where the receiving unit 902 is configured to receive a second message sent by a first network entity, where the second message carries demand information of a network component and an identifier of a network component template;

the processing unit 901 is configured to determine first deployment information based on the demand information of the network component and a network component template corresponding to the identifier of the network component template, where the first deployment information is deployment information of a network component; and the sending unit 903 is configured to send a first message to the first network entity 10, where the first message carries the first deployment information.

In one embodiment, the network component template includes deployment information of at least one network component; and determining, by the processing unit 901, first deployment information based on the demand information of the network component and a network component template corresponding to the identifier of the network component template includes: determining, by the processing unit, the first deployment information in the deployment information of the at least one network component based on the demand information of the network component.

In an embodiment, the first deployment information includes at least one of the following: a virtual resource descriptor identifier corresponding to the network component, a virtual resource deployment flavor corresponding to the network component, a virtual resource instantiation level corresponding to the network component, affinity and anti-affinity of virtual resource deployment corresponding to the network component, and virtual resource deployment location constraint information corresponding to the network component.

In one embodiment, the network component is a network slice subnet, the network component template is a network slice subnet template, and the network is a network slice.

In one embodiment, the network component is a network function, the network component template is a network function template, and the network is a network slice or a network slice subnet.

In one embodiment, when the network component is detected to meet a preset condition, the processing unit 901 is configured to determine third deployment information based on the preset condition, where the third deployment information is deployment information of the network component; and the preset condition includes at least one of the following: a quantity of users carried on the network component is greater than a preset threshold, or the second network entity is detected to be faulty.

The sending unit 903 is further configured to send a fourth message carrying the third deployment information to the first network entity 10.

In this embodiment, for functions of the processing unit 901, the receiving unit 902, and the sending unit 903, reference can be made to corresponding description of an embodiment about a method for determining deployment information of a network shown in FIG. 4, and details are not described herein again.

Figure 10:
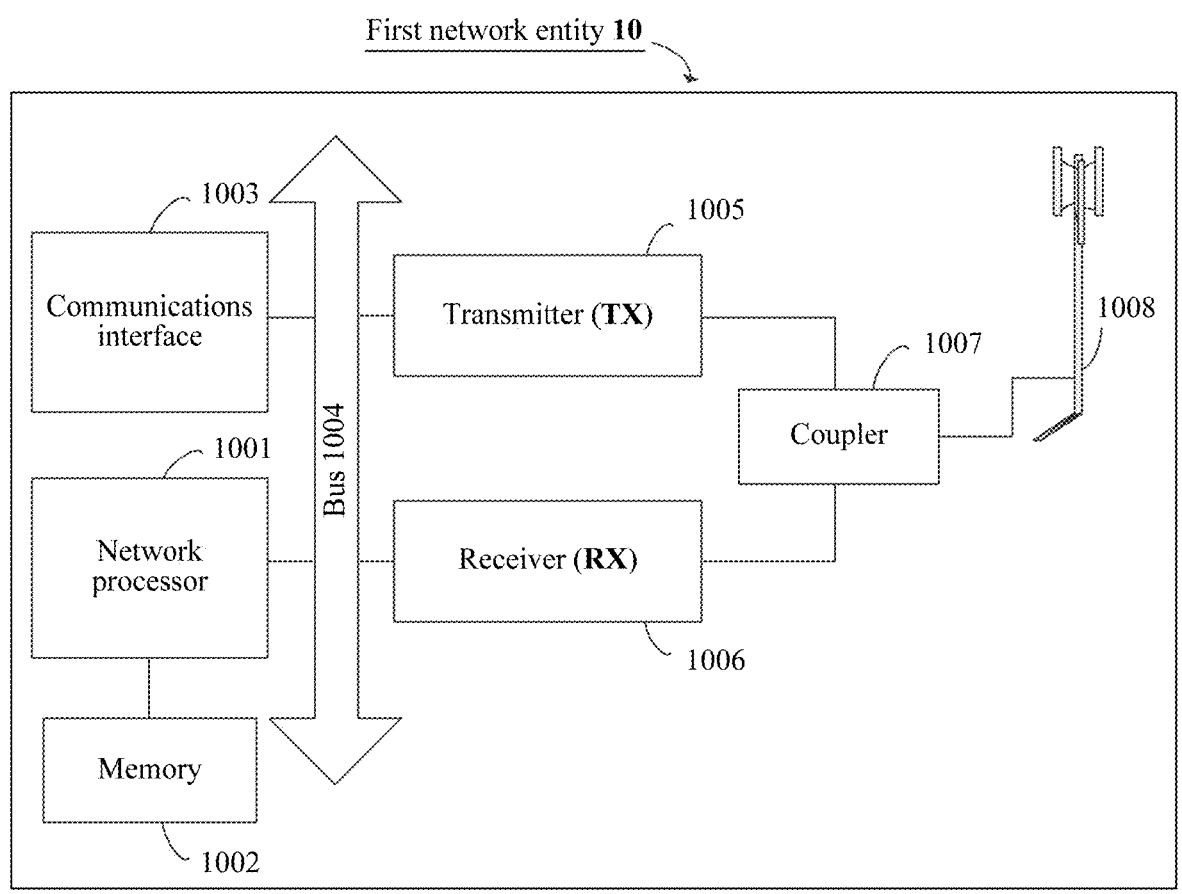
FIG. 10 is a schematic structural diagram of another network entity 10 according to an embodiment of the present disclosure.

Based on a network system architecture of FIG. 1, FIG. 10 is a schematic structural diagram of another network entity 10 according to an embodiment of the present disclosure. As shown in FIG. 10, the first network entity 10 includes: one or more network processors 1001, a memory 1002, a communications interface 1003, a transmitter 1005, a receiver 1006, a coupler 1007, and an antenna 1008. These parts may be connected through a bus 1004 or in another manner, and in FIG. 10, connecting through the bus is used as an example.

The communications interface 1003 may be configured for the first network entity 10 to communicate with another communications device, for example, the second network entity 20. Specifically, the first network entity 10 may be the network management device 102 in the network system architecture shown in FIG. 1, and the network management device 102 may communicate with the service management device, the domain management device, and the network function management device shown in FIG. 1 through the communications interface 1003. The first network entity 10 may further be the domain management device 103 in the network system architecture shown in FIG. 1, and the domain management device 103 may communicate with the network function management device shown in FIG. 1 through the communications interface 1003. Specifically, the communications interface 1003 may be a long term evolution (LTE) system communications interface, or may be a 5G or a future new air communications interface. In addition to a wireless communications interface, the first network entity 10 may further be provided with a wired communications interface 1003 to support wired communication. For example, a backhaul link between one first network entity 10 and another network device may be connected through wired communication.

The transmitter 1005 may be configured to transmit a message or data output by the network processor 1001.

In some embodiments of the present disclosure, the receiver 1005 and the receiver 1006 may be considered as a wireless modem. In the first network entity 10, there may be one or more transmitters 1005 and receivers 1006. The transmitter 1005 and the receiver 1006 may also be implemented by one or more transceivers. The antenna 1008 may be configured to convert electromagnetic energy in a transmission line into an electromagnetic wave in free space, or convert an electromagnetic wave in free space into electromagnetic energy in a transmission line. The coupler 1007 may be configured to divide a mobile communication signal into multiple channels, and allocate the mobile communication signal to a plurality of receivers 1006.

The memory 1002 is coupled to the network processor 1001, and is configured to store various software programs and/or a plurality of sets of instructions. The memory 1002 may store an operating system (a system for short below), for example, an embedded operating system such as a uCOS, a VxWorks, or an RTLinux. The memory 1002 may further store a program used to determine deployment information of a network, and the program used to determine the deployment information of the network may be used to communicate with one or more additional devices, or one or more network devices.

The network processor 1001 may be configured to manage a wireless channel, implement calling, establish and disconnect a communications link, determine deployment information of a network, and the like.

In the embodiment of the present disclosure, the network processor 1001 may be configured to read and execute a computer-readable instruction. Specifically, the network processor 1001 may be configured to invoke a program that is stored in the memory 1002 and is used to determine deployment information of a network. The memory 1002 may be configured to store, at a first network entity 10 side, an implementing program of the method for determining deployment information of a network according to one or more embodiments. Specifically, the receiver 1006 is configured to receive a first message sent by a second network entity, where the first message carries first deployment information, and the first deployment information is deployment information of a network component.

The network processor 1001 is configured to invoke a program instruction and data stored in the memory 1002, to perform the following operation:

determining second deployment information based on the first deployment information, where the second deployment information is deployment information of a network, and the network includes at least one network component.

In one embodiment, the determining, by the network processor 1001, second deployment information based on the first deployment information includes:

the network processor 1001 is configured to invoke a program instruction and data execution that are stored in the memory 1002: determining, based on the first deployment information, the second deployment information in a network template, where the network template includes deployment information of at least one network.

In one embodiment, before the receiver 1006 receives a first message sent by a second network entity, the transmitter 1005 further sends a second message to the second network entity, where the second message carries demand information of the network component and an identifier of a network component template, and the demand information of the network component and the identifier of the network component template are used to determine the first deployment information.

In one embodiment, the first deployment information includes at least one of the following: a virtual resource descriptor identifier corresponding to the network component, a virtual resource deployment flavor corresponding to the network component, a virtual resource instantiation level corresponding to the network component, affinity and anti-affinity of virtual resource deployment corresponding to the network component, and virtual resource deployment location constraint information corresponding to the network component; and the second deployment information includes at least one of the following: a virtual resource descriptor identifier corresponding to the network, a virtual resource deployment flavor corresponding to the network, a virtual resource instantiation level corresponding to the network, affinity and anti-affinity of virtual resource deployment corresponding to the network, and virtual resource deployment location constraint information corresponding to the network.

In one embodiment, the network component is a network slice subnet, the network component template is a network slice subnet template, and the network is a network slice.

In one embodiment, the network component is a network function, the network component template is a network function template, and the network is a network slice or a network slice subnet.

In one embodiment, after the determining, by the network processor 1001, second deployment information based on the first deployment information, the transmitter 1006 sends a third message carrying the second deployment information to a third network entity.

It should be noted that the network entity 10 shown in FIG. 10 is merely an implementation of this embodiment of the present disclosure. In an actual application, the network entity 10 may further include more or fewer components, and this is not limited herein.

Figure 11:
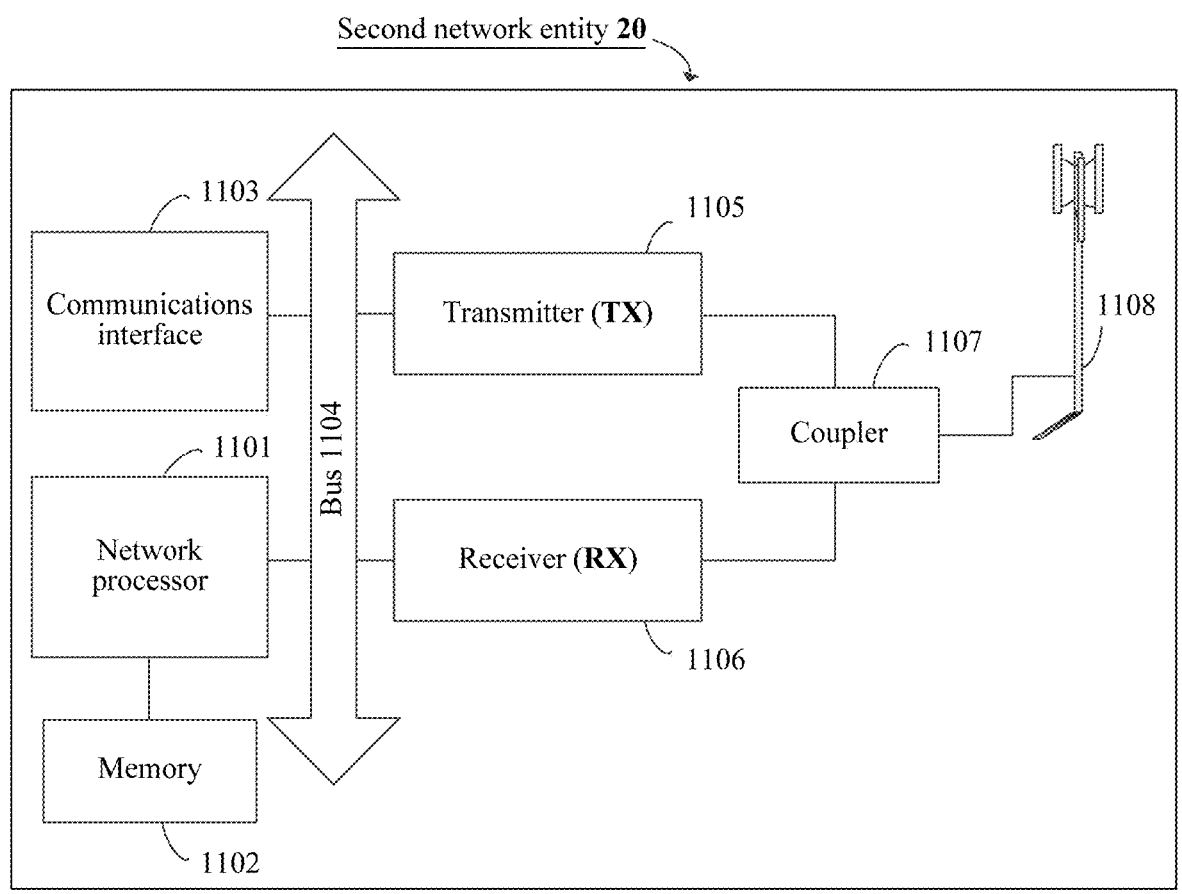
FIG. 11 is a schematic structural diagram of another network entity 20 according to an embodiment of the present disclosure.

Based on a network system architecture of FIG. 1, FIG. 11 is a schematic structural diagram of another network entity 20 according to an embodiment of the present disclosure. As shown in FIG. 11, the first network entity 20 includes: one or more network processors 1101, memories 1102, communications interfaces 1103, transmitters 1105, receivers 1106, couplers 1107, and antennas 1108. These parts may be connected through a bus 1104 or in another manner, and in FIG. 11, connecting through the bus is used as an example.

The communications interface 1103 may be configured for the first network entity 20 to communicate with another communications device, for example, the first network entity 10. Specifically, the second network entity 20 may be the domain management device 103 in the network system architecture shown in FIG. 1, and the domain management device 103 may communicate with the network management device shown in FIG. 1 through the communications interface 1103. The second network entity 20 may also be a network function management device 104 in the network system architecture shown in FIG. 1, and the network function management device 104 may communicate with the domain management device and the network management device shown in FIG. 1 through the communications interface 1003. Specifically, the communications interface 1103 may be a long term evolution (LTE) system communications interface, or may be a 5G or a future new air communications interface. In addition to a wireless communications interface, the second network entity 20 may further be provided with a wired communications interface 1103 to support wired communication. For example, a backhaul link between one second network entity 20 and another network device may be connected through wired communication.

The transmitter 1105 may be configured to transmit a message or data output by the network processor 1101.

In some embodiments of the present disclosure, the receiver 1105 and the receiver 1106 may be considered as a wireless modem. In the second network entity 20, there may be one or more transmitters 1105 and receivers 1106. The transmitter 1105 and the receiver 1106 may also be implemented by one or more transceivers. The antenna 1108 may be configured to convert electromagnetic energy in a transmission line into an electromagnetic wave in free space, or convert an electromagnetic wave in free space into electromagnetic energy in a transmission line. The coupler 1007 may be configured to divide a mobile communication signal into multiple channels, and allocate the mobile communication signal to a plurality of receivers 1106.

The memory 1102 is coupled to the network processor 1101, and is configured to store various software programs and/or a plurality of sets of instructions. The memory 1102 may store an operating system (a system for short below), for example, an embedded operating system such as a uCOS, a VxWorks, or an RTLinux. The memory 1002 may further store a program used to determine deployment information of a network, and the program used to determine the deployment information of the network may be used to communicate with one or more additional devices, or one or more network devices.

The network processor 1101 may be configured to manage a wireless channel, implement calling, establish and disconnect a communications link, determine deployment information of a network, and the like.

In the embodiment of the present disclosure, the network processor 1101 may be configured to read and execute a computer-readable instruction. Specifically, the network processor 1101 may be configured to invoke a program that is stored in the memory 1102 and is used to determine deployment information of a network. The memory 1102 may be configured to store, at a second network entity 20 side, an implementing program of the method for determining deployment information of a network according to one or more embodiments. Specifically, the receiver 1106 is configured to receive a second message sent by a first network entity, where the second message carries demand information of a network component and an identifier of a network component template;

The network processor 1101 may be configured to invoke a program stored in the memory 1102, to execute the following operation:

determining first deployment information based on the demand information of the network component and a network component template corresponding to the identifier of the network component template, where the first deployment information is deployment information of a network component.

The transmitter 1105 is configured to send a first message to the first network entity, where the first message carries the first deployment information.

In one embodiment, the network component template includes deployment information of at least one network component; and the determining, by the network processor 1101, first deployment information based on the demand information of the network component and a network component template corresponding to the identifier of the network component template includes: determining, by the network processor 1101, the first deployment information in the deployment information of the at least one network component based on the demand information of the network component.

In one embodiment, the first deployment information includes at least one of the following: a virtual resource descriptor identifier corresponding to the network component, a virtual resource deployment flavor corresponding to the network component, a virtual resource instantiation level corresponding to the network component, affinity and anti-affinity of virtual resource deployment corresponding to the network component, and virtual resource deployment location constraint information corresponding to the network component.

In one embodiment, the network component is a network slice subnet, the network component template is a network slice subnet template, and the network is a network slice.

In one embodiment, the network component is a network function, the network component template is a network function template, and the network is a network slice or a network slice subnet.

In one embodiment, the network processor 1101 is further configured to: when the second network entity detects that the network component meets a preset condition, where the third deployment information is deployment information of the network component; and the preset condition includes at least one of the following: a quantity of users carried on the network component is greater than a preset threshold, or the second network entity is detected to be faulty.

The transmitter 1105 sends a fourth message carrying the third deployment information to the first network entity.

It should be noted that the network entity 20 shown in FIG. 11 is merely an implementation of this embodiment of the present disclosure. In an actual application, the network entity 20 may further include more or fewer components, and this is not limited herein.

Figure 12:
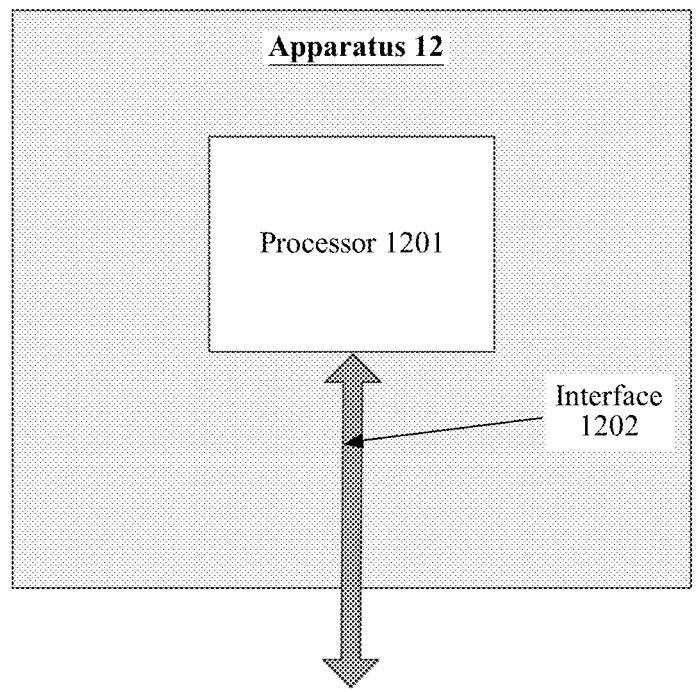
FIG. 12 is a schematic structural diagram of an apparatus according to an embodiment of the present disclosure.

Refer to FIG. 12, and FIG. 12 is a schematic structural diagram of an apparatus according to an embodiment of the present disclosure. As shown in FIG. 12, an apparatus 120 may include: a processor 1201, and one or more interfaces 1202 coupled to the processor 1201.

The processor 1201 may be configured to read and execute a computer-readable instruction. In a specific implementation, the processor 1201 may mainly include a controller, an arithmetic unit, and a register. The controller is mainly responsible for instruction decoding, and sends a control signal to an operation corresponding to the instruction. The arithmetic unit is mainly responsible for perform a fixed-point or floating-point arithmetic operation, a shift operation, a logic operation, and the like, and may perform an address operation and conversion. The register is mainly responsible for saving a register operand and an intermediate operation result temporarily stored during execution of an instruction. In a specific implementation, a hardware architecture of the processor 1201 may be an application-specific integrated circuit (ASIC) architecture, or the like. The processor 1201 may be single-core, or may be a multi-core.

The interface 1202 may be configured to input data to be processed to the processor 1201, and can output a processing result of the processor 1201 to an outside.

In the present disclosure, the processor 1201 may be configured to invoke, from the memory, an implementing program that is at a first network entity side and is of the method for determining deployment information of a network according to one or more embodiments of the present disclosure, and execute an instruction included in the program. The interface 1202 may be configured to output an execution result of the processor 1201. For the method for determining deployment information of a network provided by one or more embodiments of the present disclosure, reference may be made to the foregoing various embodiments, and details are not described herein again.

It should be noted that corresponding functions of the processor 1201 and the interface 1202 can be implemented by using a hardware design, or can be implemented by using a software design, or can be implemented by a combination of software and hardware, which is not limited herein.

Figure 13:
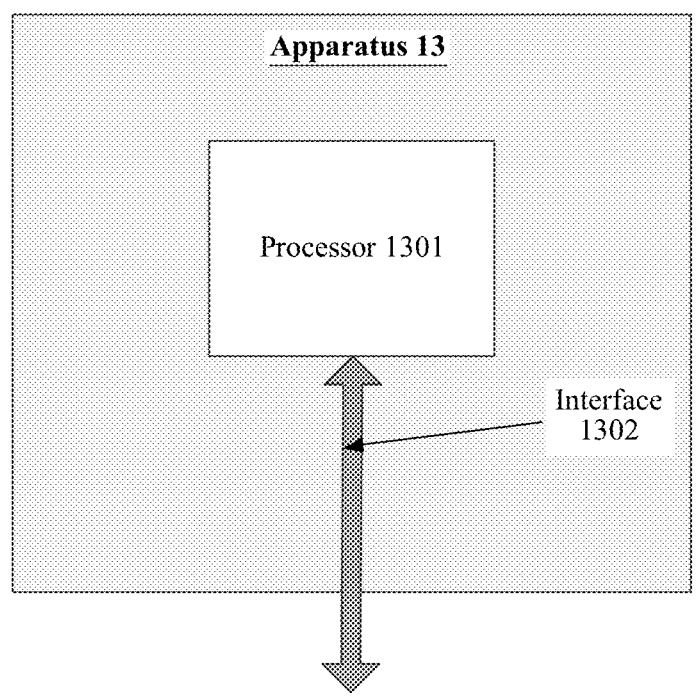
FIG. 13 is a schematic structural diagram of another apparatus according to an embodiment of the present disclosure.

Refer to FIG. 13, FIG. 13 is a schematic structural diagram of another apparatus according to an embodiment of the present disclosure. As shown in FIG. 13, an apparatus 130 may include: a processor 1301, and one or more interfaces 1302 coupled to the processor 1301.

The processor 1301 may be configured to read and execute a computer-readable instruction. In a specific implementation, the processor 1301 may mainly include a controller, an arithmetic unit, and a register. The controller is mainly responsible for instruction decoding, and sends a control signal to an operation corresponding to the instruction. The arithmetic unit is mainly responsible for perform a fixed-point or floating-point arithmetic operation, a shift operation, a logic operation, and the like, and may perform an address operation and conversion. The register is mainly responsible for saving a register operand and an intermediate operation result temporarily stored during execution of an instruction. In a specific implementation, a hardware architecture of the processor 1301 may be an ASIC architecture, or the like. The processor 1301 may be single-core, or may be a multi-core.

The interface 1302 may be configured to input data to be processed to the processor 1301, and can output a processing result of the processor 1301 to an outside.

In the present disclosure, the processor 1301 may be configured to invoke, from the memory, an implementing program that is at a second network entity side and is of the method for determining deployment information of a network according to one or more embodiments of the present disclosure, and execute an instruction included in the program. The interface 1302 may be configured to output an execution result of the processor 1301. For the method for determining deployment information of a network provided by one or more embodiments of the present disclosure, reference may be made to the foregoing various embodiments, and details are not described herein again.

It should be noted that corresponding functions of the processor 1301 and the interface 1302 can be implemented by using a hardware design, or can be implemented by using a software design, or can be implemented by a combination of software and hardware, which is not limited herein.

Methods or algorithm operations described in combination with the content disclosed in this embodiment of the present disclosure may be implemented by hardware, or may be implemented by a processor by executing a software program instruction. The software program instruction may include a corresponding software module. The software module may be stored in a RAM, a flash memory, a ROM, an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to the processor, so that the processor can read information from the storage medium and can write information into the storage medium. Certainly, the storage medium may alternatively be a component of a processor. The processor and the storage medium may be located in an ASIC. In addition, the ASIC may be located in a transceiver or a relay device. Certainly, as discrete assemblies, the processor and the storage medium may exist in a first network entity or a second network entity.

It may be understood that, in the present disclosure, technical terms and technical solutions among different embodiments may make reference to each other based on their internal logic, and embodiments to which the technical terms and the technical solutions are applicable are not limited in the present disclosure. A new embodiment may be formed by combining the technical solutions in the different embodiments.

It may be understood that, in the embodiment of the present disclosure, the processor may be a central processing unit (CPU), or may be a general-purpose processor, a digital signal processor (DSP), an application specific integrated circuit (ASIC), a field programmable gate array (FPGA) or another programmable logic device, a transistor logic device, a hardware component, or any combination thereof. The general-purpose processor may be a microprocessor, or may be any commonly used processor.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of the present disclosure are all or partially generated. The computer may be a general-purpose computer, a dedicated computer, a computer network, or another programmable apparatus. The computer instruction may be stored in a computer-readable storage medium, or transmitted by using the computer-readable storage medium. The computer instruction may be transmitted from a website, computer, server, or data center to another website, computer, server, or data center in a wired (for example, by using a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A method for determining deployment information of a network, comprising:
  receiving, by a first network entity, a first message sent by a second network entity, wherein the first message carries first deployment information, and the first deployment information is deployment information of a network component in a network; and
  determining, by the first network entity, second deployment information that is deployment information of the network based on the first deployment information and an indication of an association relationship between the deployment information of the network component and the deployment information of the network, wherein the network comprises at least one network component.

2. The method for determining deployment information of a network according to claim 1, further comprising:
  determining, by the first network entity, the second deployment information in a network template based on the first deployment information, wherein the network template comprises deployment information of at least one network.

3. The method for determining deployment information of a network according to claim 1, wherein before the receiving, by the first network entity, the first message sent by the second network entity, the method further comprises:
  sending, by the first network entity, a second message to the second network entity, wherein the second message carries demand information of the network component and an identifier of a network component template, and the demand information of the network component and the identifier of the network component template are used to determine the first deployment information.

4. The method for determining deployment information of a network according to claim 1, wherein the first deployment information comprises at least one of the following: a virtual resource descriptor identifier corresponding to the network component, a virtual resource deployment flavor corresponding to the network component, a virtual resource instantiation level corresponding to the network component, affinity and anti-affinity of virtual resource deployment corresponding to the network component, and virtual resource deployment location constraint information corresponding to the network component; and
  the second deployment information comprises at least one of the following: a virtual resource descriptor identifier corresponding to the network, a virtual resource deployment flavor corresponding to the network, a virtual resource instantiation level corresponding to the network, affinity and anti-affinity of virtual resource deployment corresponding to the network, and virtual resource deployment location constraint information corresponding to the network.

5. The method for determining deployment information of a network according to claim 3, wherein the network component is a network slice subnet, the network component template is a network slice subnet template, and the network is a network slice.

6. The method for determining deployment information of a network according to claim 3, wherein the network component is a network function, the network component template is a network function template, and the network is a network slice or a network slice subnet.

7. The method for determining deployment information of a network according to claim 1, wherein after the determining, by the first network entity, the second deployment information based on the first deployment information, the method further comprises:
  sending, by the first network entity, a third message carrying the second deployment information to a third network entity.

8. The method for determining deployment information of a network according to claim 1, wherein
  before the second network entity sends the first message to the first network entity,
  the second network entity receives a second message sent by the first network entity, wherein the second message carries demand information of the network component and an identifier of a network component template; and
  determines the first deployment information based on the demand information of the network component and the network component template corresponding to the identifier of the network component template.

9. The method for determining deployment information of a network according to claim 1, wherein
  wherein the second network entity sends a fourth message carrying a third deployment information to the first network entity.

10. A network entity, comprising:
  at least one processor; and
  a non-transitory computer-readable storage medium coupled to the at least one processor and storing programming instructions for execution by the at least one processor, the programming instructions instructing the at least one processor to:
  receive a first message sent by a second network entity, wherein the first message carries first deployment information, and the first deployment information is deployment information of a network component in a network; and
  determine second deployment information that is deployment information of the network based on the first deployment information and an indication of an association relationship between the deployment information of the network component and the deployment information of the network, wherein the network comprises at least one network component.

11. The network entity according to claim 10, wherein the at least one is processor configured to:
  determine the second deployment information in a network template based on the first deployment information, wherein the network template comprises deployment information of at least one network.

12. The network entity according to claim 10, wherein the at least one processor is configured to send a second message to the second network entity, wherein the second message carries demand information of the network component and an identifier of a network component template, and the demand information of the network component and the identifier of the network component template are used to determine the first deployment information.

13. The network entity according to claim 10, wherein the first deployment information comprises at least one of the following: a virtual resource descriptor identifier corresponding to the network component, a virtual resource deployment flavor corresponding to the network component, a virtual resource instantiation level corresponding to the network component, affinity and anti-affinity of virtual resource deployment corresponding to the network component, and virtual resource deployment location constraint information corresponding to the network component; and the second deployment information comprises at least one of the following: a virtual resource descriptor identifier corresponding to the network, a virtual resource deployment flavor corresponding to the network, a virtual resource instantiation level corresponding to the network, affinity and anti-affinity of virtual resource deployment corresponding to the network, and virtual resource deployment location constraint information corresponding to the network.

14. The network entity according to claim 12, wherein the network component is a network slice subnet, the network component template is a network slice subnet template, and the network is a network slice.

15. The network entity according to claim 12, wherein the network component is a network function, the network component template is a network function template, and the network is a network slice or a network slice subnet.

16. The network entity according to claim 10, wherein the at least one processor configured to send a third message carrying the second deployment information to a third network entity.

17. A system for determining deployment information of a network, comprising:
a first network entity and a second network entity wherein the second network entity comprises at least one processor; and
a non-transitory computer-readable storage medium coupled to the at least one processor and storing programming instructions for execution by the at least one processor, the programming instructions instructing the at least one processor to:

receive a second message from the first network entity, wherein the second message carries demand information of a network component and an identifier of a network component template;
determine first deployment information based on the demand information of the network component and a network component template corresponding to the identifier of the network component template, wherein the first deployment information is deployment information of the network component; and send a first message to the first network entity, wherein the first message carries the first deployment information;
wherein the first network entity comprises at least one processor; and
a non-transitory computer-readable storage medium coupled to the at least one processor and storing programming instructions for execution by the at least one processor, the programming instructions instructing the at least one processor to: receive the first message, and to determine second deployment information based on the first deployment information, wherein the second deployment information is deployment information of a network, and the network comprises at least one network component.

18. The system according to claim 17, wherein
the programming instructions further instruct the at least one processor of the first network entity to determine the second deployment information in a network template based on the first deployment information, wherein the network template comprises deployment information of at least one network.

19. The system according to claim 17, wherein
the programming instructions further instruct the at least one processor of the first network entity to send a third message carrying the second deployment information to a third network entity.

20. The system according to claim 17, wherein
the programming instructions further instruct the at least one processor of the second network entity to send a fourth message carrying a third deployment information to the first network entity.

* * * * *